(12) United States Patent
Takama

(10) Patent No.: US 9,880,394 B2
(45) Date of Patent: Jan. 30, 2018

(54) DISPLAY APPARATUS WITH IMPROVED VIEWING ANGLES

(75) Inventor: Daisuke Takama, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 721 days.

(21) Appl. No.: 13/406,736

(22) Filed: Feb. 28, 2012

(65) Prior Publication Data

US 2012/0243083 A1    Sep. 27, 2012

(30) Foreign Application Priority Data

Mar. 25, 2011   (JP) ................................. 2011-067214

(51) Int. Cl.
  *G02B 27/22*   (2006.01)
  *G09G 3/00*   (2006.01)
  (Continued)

(52) U.S. Cl.
  CPC ......... *G02B 27/2214* (2013.01); *G09G 3/003* (2013.01); *G09G 3/3611* (2013.01);
  (Continued)

(58) Field of Classification Search
  CPC ........................... G02B 27/22; G02B 27/2214;
    G02B 27/2228; G02B 27/2257; G02B 27/2235;
  (Continued)

(56) References Cited

U.S. PATENT DOCUMENTS

| 7,417,648 B2 * | 8/2008 | Credelle | ........... G02F 1/133514 345/690 |
| 2004/0201558 A1 * | 10/2004 | Arnold | ................. G09G 3/3216 345/83 |

(Continued)

FOREIGN PATENT DOCUMENTS

| CN | 101154329 A | 4/2008 |
| CN | 1011154329 A | 4/2008 |

(Continued)

OTHER PUBLICATIONS

Japanese Office Examination Report issued in connection with related Japanese Patent Application No. 2011-067214 dated Sep. 24, 2014.

(Continued)

*Primary Examiner* — Stephone B Allen
*Assistant Examiner* — Jyotsna Dabbi
(74) *Attorney, Agent, or Firm* — Dentons US LLP

(57) ABSTRACT

A display apparatus including a display unit in which pixels configured from a group of a plurality of types of sub-pixels displaying different primary colors are arranged in a two-dimensional matrix shape in the row direction and the column direction; and an optical separation unit separating an image displayed on the display unit into images for a plurality of observation points, in which, when one of the primary colors displayed by the sub-pixels is expressed as a first primary color, the distance between the boundaries of respectively adjacent sub-pixel columns formed of sub-pixels displaying the first primary color is shorter than the distance between boundaries of respectively adjacent sub-pixel columns formed of the same type of sub-pixels displaying different primary colors to the first primary color.

6 Claims, 18 Drawing Sheets

(51) Int. Cl.
*G09G 3/36* (2006.01)
*H04N 13/04* (2006.01)

(52) U.S. Cl.
CPC ..... *H04N 13/0409* (2013.01); *H04N 13/0422* (2013.01); *G09G 2300/023* (2013.01); *G09G 2300/0452* (2013.01); *G09G 2340/06* (2013.01)

(58) Field of Classification Search
CPC ............ G02B 27/225; H04N 13/04; H04N 13/0404–13/0406; H04N 13/0497; H04N 13/0438; H04N 13/0003; H04N 13/0055; H04N 13/0422; H04N 13/0459; H04N 9/3197; H04N 9/3105; H04N 13/0409; G03B 35/00–35/12; G03B 31/06; G03B 31/00; G09G 3/3607; G09G 3/3611; G09G 2300/0452; G09G 2340/06; G09G 2300/023; G09G 2300/0439–2300/0443; G09G 13/0422; G09G 13/0409
See application file for complete search history.

(56) References Cited

U.S. PATENT DOCUMENTS

| | | | | |
|---|---|---|---|---|
| 2006/0221092 | A1* | 10/2006 | Noguchi | G09G 3/3233 345/589 |
| 2007/0291054 | A1* | 12/2007 | Shin | G09G 3/003 345/694 |
| 2008/0080049 | A1 | 4/2008 | Hamagishi et al. | |
| 2009/0046142 | A1* | 2/2009 | Cha | H04N 13/0404 348/54 |
| 2009/0115952 | A1* | 5/2009 | Nakamura et al. | 349/143 |
| 2010/0118045 | A1* | 5/2010 | Brown Elliott | G02B 27/2214 345/589 |

FOREIGN PATENT DOCUMENTS

| | | | | |
|---|---|---|---|---|
| CN | 101958098 A | 1/2011 | | |
| EP | 2676447 A1 * | 12/2013 | | 359/463 |
| JP | H62-014601 | 1/1987 | | |
| JP | S62-014601 | 1/1987 | | |
| JP | 05-122733 | 5/1993 | | |
| JP | H08-029778 | 2/1996 | | |
| JP | 3565391 | 6/2004 | | |
| JP | 2005-331841 | 12/2005 | | |
| JP | 2010-210982 | 9/2010 | | |
| WO | WO 2007/148519 A1 | 12/2007 | | |

OTHER PUBLICATIONS

Chinese Office Examination Report issued in connection with related Chinese Patent Application No. CN 201210079145.6 dated Feb. 28, 2015.

* cited by examiner

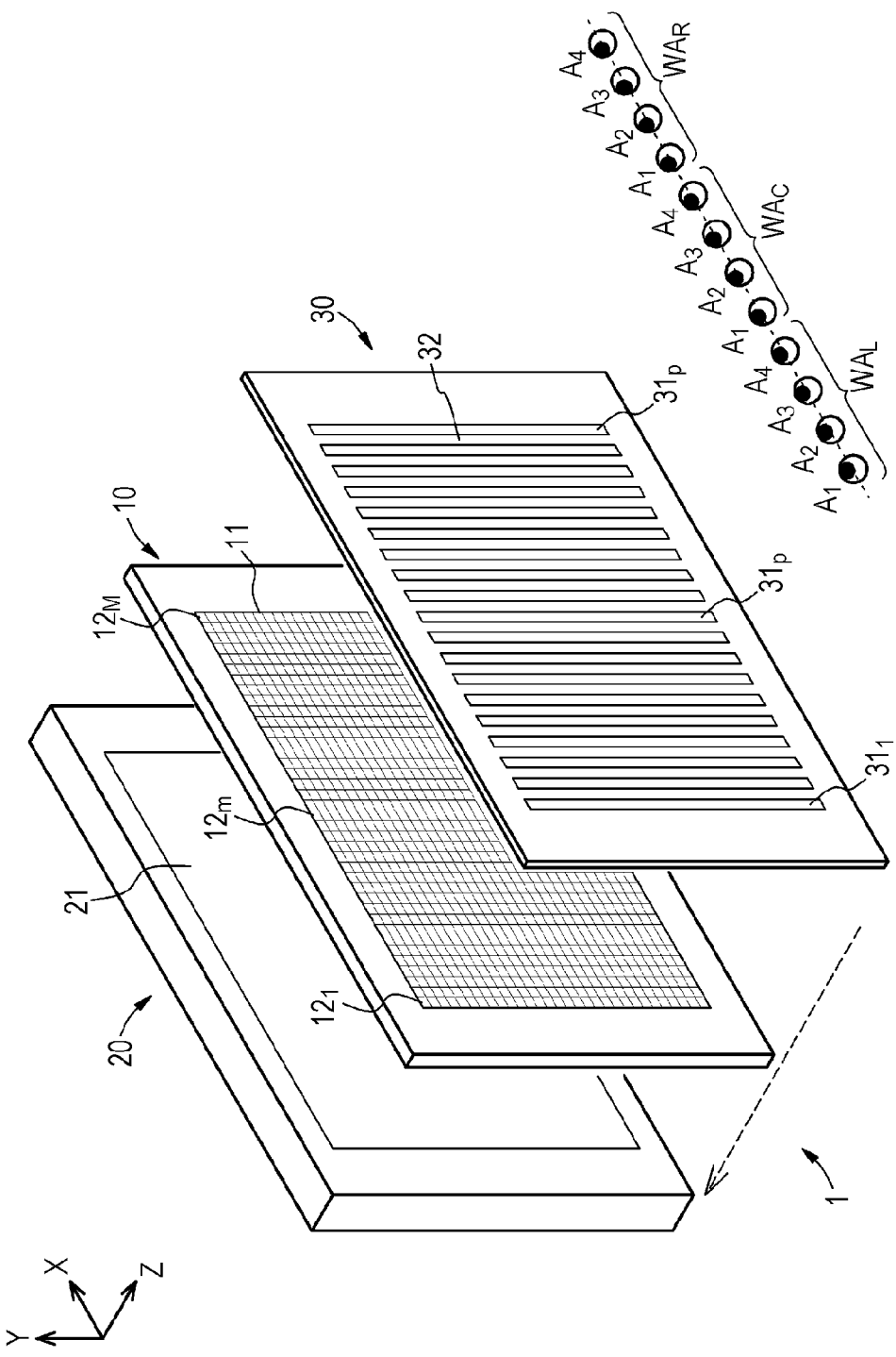

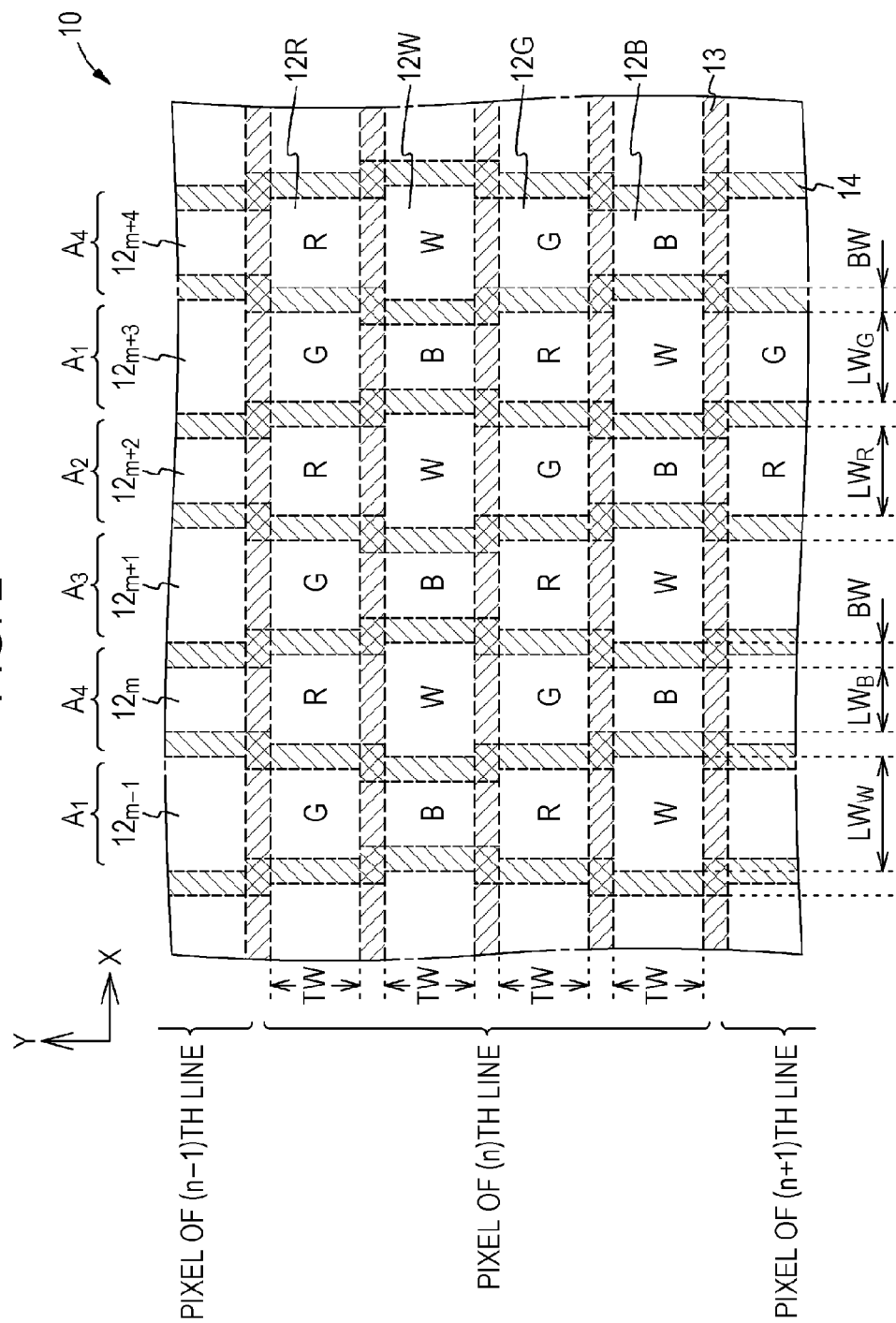

DISPLAY APPARATUS WITH IMPROVED VIEWING ANGLES

BACKGROUND

The present disclosure relates to a display apparatus. More specifically, the present disclosure relates to a display apparatus capable of displaying images for a plurality of observation points.

Various types of display apparatuses are established which may display images for a plurality of observation points and with which stereoscopic viewing is also possible, for example, by displaying images having parallax. As such a display apparatus, the realization of a display apparatus combining an optical separation unit made of a parallax barrier, a lens sheet and the like and a display unit (two-dimensional image display apparatus) is progressing.

For example, the display apparatus using the parallax barrier as an optical separation unit is typically configured from a display unit made of a display panel or the like provided with a plurality of pixels arranged in a matrix shape which is two-dimensional in the row direction (horizontal direction) and the column direction (vertical direction), and a parallax barrier provided with an aperture extending substantially in the column direction.

Display apparatuses provided with an optical separation unit may be classified into, for example, ones in which the optical separation unit is arranged on the front surface of a display unit as shown in FIG. 7 of Japanese Unexamined Patent Application Publication No. 5-122733, and, for example, as shown in FIG. 10 of Japanese Patent No. 3565391, ones provided with a display unit which is a transmissive type display panel and an illumination unit and in which the optical separation unit is arranged between the display unit and the illumination unit (in other words, the optical separation unit is arranged on the rear surface of the display unit).

FIG. 18 shows a conceptual diagram of a display apparatus in which an optical separation unit is arranged on the front surface of a display unit.

As shown in FIG. 18, the light beam group emitted from the pixel group having the reference numerals L2, L4, L6, L8, and L10 reaches an observation point 1, and the light beam group emitted from the pixel group having the reference numerals R1, R3, R5, R7, and R9 reaches an observation point 2.

Here, the left eye and right eye of an image observer are respectively positioned at observation point 1 and observation point 2. By displaying an image for the left eye using the pixel group having the reference numerals L2, L4, L6, L8, and L10 and displaying an image for the right eye using the pixel group having the reference numerals R1, R3, R5, R7, and R9, the image observer may recognize an image as a stereoscopic image. That is, when the image observer is positioned in a region in which the image of observation point 1 is received by the left eye and the image of observation point 2 is received by the right eye, the image is recognized as a stereoscopic image.

In the display unit, typically, between respective adjacent pixels (in the case of a color display, between respective adjacent sub-pixels), for example, there are light shielding parts caused by wiring or the like.

When an image observer observes an image, the position of the observation point may not be fixed. Accordingly, there are cases when an image is observed at a location separated from the ideal observation point from the design perspective. For example, as shown in FIG. 19, when an image is observed in an observation point 1' separated from the ideal observation point 1, portions of pixels and light shielding parts are also visible. The extent to which the portion of the light shielding part is visible changes according to the distance between the observation point at which the image is actually observed and the ideal observation point, and the like. Therefore, moiré, which changes due to the movement of the observation point when the image is observed, occurs in the observed image, whereby the visibility is deteriorated.

SUMMARY

In view of the above, an object of the present invention is to provide a display apparatus capable of reducing the deterioration of visibility caused by the movement of the observation point in the present disclosure.

According to an embodiment of the present disclosure, there is provided a display apparatus including: a display unit in which pixels configured from a group of a plurality of types of sub-pixels displaying different primary colors are arranged in a two-dimensional matrix shape in a row direction and a column direction; and an optical separation unit separating an image displayed on the display unit into images for a plurality of observation points, in which, when one of the primary colors displayed by the sub-pixels is expressed as a first primary color, the distance between the boundaries of the respectively adjacent sub-pixel columns formed of the sub-pixels displaying the first primary color is shorter than the distance between the boundaries of respectively adjacent sub-pixel columns formed of the same type of sub-pixels displaying different primary colors to the first primary color.

In the display apparatus according to an embodiment of the present disclosure, when one of the primary colors displayed by the sub-pixels is expressed as a first primary color, the distance between the boundaries of the respectively adjacent sub-pixel columns formed of the sub-pixels displaying the first primary color is shorter than the distance between the boundaries of respectively adjacent sub-pixel columns formed of the same type of sub-pixels displaying different primary colors to the first primary color. Thus, moiré is reduced in the image displayed by the sub-pixels displaying the first primary color, whereby it is possible to reduce the deterioration of the visibility caused by the movement of the observation point.

BRIEF DESCRIPTION OF THE DRAWINGS

FIG. 1 is a schematic perspective diagram in which the display apparatus of the first embodiment is virtually separated.

FIG. 2 is a schematic plan diagram of a part of the display unit.

DETAILED DESCRIPTION OF EMBODIMENTS

Figure 3A:
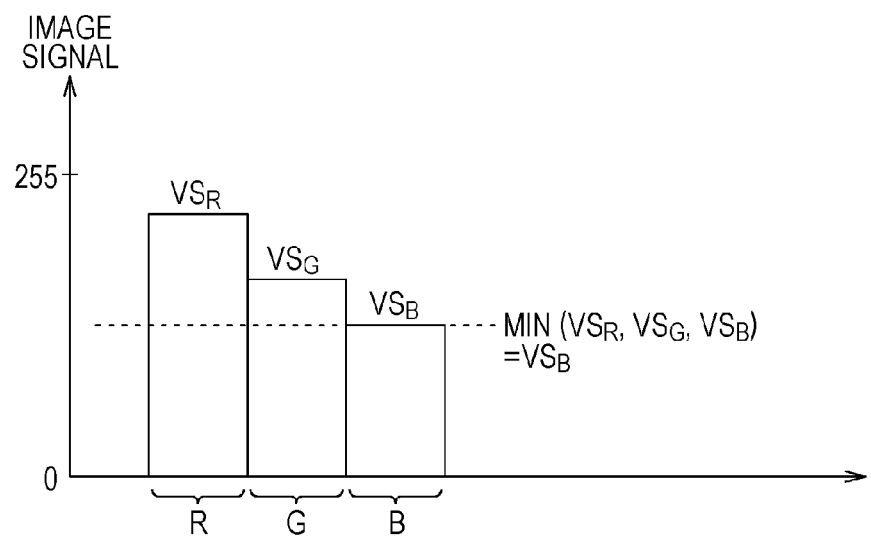
FIGS. 3A and 3B are schematic graphs for describing the image signals driving the sub-pixel.

Below, with reference to the drawings, the present disclosure will be described based on embodiments. The present disclosure is not intended to be limited to the embodiments and the various figures and materials in the embodiments are only for illustration. In the description below, the same elements or elements having the same functions use the same reference numerals and overlapping description thereof is omitted. Further, the description is given in the following order.

1. Description Relating to the Entire Display Apparatus According to the Embodiments of the Present Disclosure
2. First Embodiment (and others)

Description Relating to the Entire Display Apparatus According to the Embodiments of the Present Disclosure In the display apparatus according to an embodiment of the present disclosure, pixels configured from a group of sub-pixels of a plurality of different types displaying different primary colors are arranged in a display unit. The display unit may be configured as a so-called color display in which one pixel is formed of a group of three types of sub pixels. In the case of a color display, typically, one pixel is formed of a sub-pixel displaying red, a sub-pixel displaying green, and a sub-pixel displaying blue. In some cases, the pixel may be configured from one group in which one type or a plurality of types of sub-pixel is further added to the three types of sub-pixel (for example, one group in which a sub-pixel displaying white is added in order to improve brightness, one group in which a sub-pixel displaying a complementary color is added in order to widen the color reproduction range, one group in which a sub-pixel displaying yellow is added in order to widen the color reproduction range, and one group in which a sub-pixel displaying yellow and cyan is added in order to widen the color reproduction range).

As mentioned above, in the display apparatus according to an embodiment of the present disclosure, when one of the primary colors displayed by the sub-pixels is expressed as a first primary color, the distance between the boundaries of the respectively adjacent sub-pixel columns formed of the sub-pixels displaying the first primary color is shorter than the distance between the boundaries of respectively adjacent sub-pixel columns formed of the same type of sub-pixels displaying different primary colors to the first primary color. It is preferable to adopt a configuration in which the first primary color is the primary color with the highest luminosity in the primary colors displayed by the sub-pixels.

In this case, it is possible to adopt a configuration in which, when the primary color having the lowest luminosity in the primary colors displayed by the sub-pixels is expressed as a second primary color, the distance between the boundaries of the respectively adjacent sub-pixel columns formed of the sub-pixels displaying the second primary color is longer than the distance between the boundaries of respectively adjacent sub-pixel columns formed of the same type of sub-pixels displaying different primary colors to the second primary color. In addition, the sub-pixel displaying the first primary color and the sub-pixel displaying the second primary color may be configured so as to be alternately lined up in the row direction and arranged.

In the display apparatus according to an embodiment of the present disclosure including the various types of preferable configuration described above, it is possible to adopt a configuration in which the boundaries of the respectively adjacent sub-pixel columns formed of sub-pixels displaying the first primary color overlap.

In the display apparatus according to an embodiment of the present disclosure including the various types of preferable configuration described above, it is possible to adopt a configuration in which the optical separation unit is arranged to face the front surface of the display unit.

Alternatively, it is possible to adopt a configuration in which the display unit may be formed of a transmissive type display panel, the display apparatus may be further provided with an illumination unit illuminating a display unit from the rear surface, and the optical separation unit may be arranged between the illumination unit and the display unit. In the former case, as the display unit, it is possible to use a common display member such as a liquid crystal display panel, an electroluminescent display panel, or a plasma display panel. In the latter case, as the display unit, for example, it is possible to use a common display member such as a transmissive type liquid crystal display panel.

The configuration of the optical separation unit is not particularly limited and it is possible to use a common member such as a parallax barrier or a lens sheet such as a lenticular lens. The optical separation unit may have a fixed configuration or may have a dynamically switchable configuration.

A fixed parallax barrier may use a base material formed of a common transparent material such as acrylic based resins, polycarbonate resins (PC), ABS resins, polymethyl methacrylate (PMMA), polyarylate resin (PAR), polyethylene terephthalate resin (PET), or glass, and may be formed by common methods such as various printing methods such as a screen printing method or an ink-jet printing method, various plating methods such as an electroplating method and an electroless plating method, and a lift-off method in combination with a photolithographic method and an etching method. On the other hand, a dynamically switchable parallax barrier, for example, may adopt a configuration using an electrically switchable light valve provided with a liquid crystal material layer. The type of material configuring the light valve using the liquid crystal material layer and the operation mode of the liquid crystal material layer are not particularly limited. In some cases, it is also possible to use a liquid crystal display panel of a monochrome display as a dynamic parallax barrier. The size, column arrangement pitch, and the like of the apertures of the parallax barrier may be appropriately set according to the specifications or the like of the display apparatus.

A fixed lens sheet, for example, may adopt a configuration integrally formed using the above-described common transparent material or the like, or may adopt a configuration forming lens columns using a light sensitive resin material or the like on the sheet shaped base material formed of the above-described material, for example. On the other hand, a dynamically switchable lens sheet, for example, may adopt a configuration provided with a pair of transparent sheets and a liquid crystal material layer arranged between sheets, and forming an electrically switchable refractive index distribution lens using a liquid crystal material layer. The optical power of the lens column, the pitch of the lens columns, and the like may be appropriately set according to the specifications of the display apparatus or the like.

In the configuration in which the display apparatus is provided with a transmissive type display panel and an illumination unit, it is possible to use a common illumination unit. The configuration of the illumination unit is not particularly limited. In general, the illumination unit may be configured from common members such as a light source, a prism sheet, a diffusion sheet, a light-guiding plate, or the like.

In the embodiment described below, a transmissive type color liquid crystal display panel of an active matrix system is used as a display unit, and a fixed parallax barrier is used as an optical separation unit. Further, in the embodiment, it is described that the optical separation unit is set so as to be arranged between a display unit and an illumination unit.

The liquid crystal display panel, for example, is formed of a front panel provided with a transparent first electrode, a rear panel provided with a transparent second electrode, and a liquid crystal material arranged between the front panel and rear panel. The operation mode of the liquid crystal display panel is not particularly limited. A configuration of being driven in a so-called TN (Twisted Nematic) mode may be adopted or a configuration of being driven in a VA (Vertical Alignment) mode or an IPS (In-Plane Switching) mode may be adopted.

More specifically, the front panel, for example, is configured from a first substrate formed of a glass substrate, a transparent first electrode provided on the inner surface of the first substrate (also called a common electrode, for example, ITO (Indium Tin Oxide)), and a polarizing film provided on the outer surface of the first substrate. In the transmissive type color liquid crystal display apparatus, a color filter coated with an overcoat layer formed of acrylic resin or epoxy resin is provided on an inner surface of the first substrate. The arrangement pattern of the color filter is not particularly limited. Thus, the front panel also has a configuration in which the transparent first electrode is formed on the overcoat layer. In addition, an alignment film is formed on the transparent first electrode.

Meanwhile, the rear panel, for example, is configured of a second substrate formed of a glass substrate, a switching element formed on an inner surface of the second substrate, a transparent second electrode which is controlled to be conductive or non-conductive by the switching element (also called a pixel electrode, for example, formed of ITO), and a polarizing film provided on an outer surface of the second substrate. An alignment film is formed on the entire surface including the transparent second electrode. The various members and liquid crystal material configuring the liquid crystal display panel may be configured from common members or materials. As a switching element, for example, a three terminal element such as a thin film transistor (TFT: Thin Film Transistor), or a two terminal element such as a MIM (Metal Insulator Metal) element, a varistor element, a diode, or the like may be exemplified. For example, such switching elements are connected to the scanning line extending in the row direction and the signal line extending in the column direction. Light shielding parts are formed between adjacent sub-pixels by wirings such as the scanning line and signal line.

When the number of pixels of the display unit M×N is expressed by (M, N), as the values of (M, N), specifically, several image display resolutions may be exemplified such as VGA (640, 480), S-VGA (800, 600), XGA (1024, 768), APRC (1152, 900), S-XGA (1280, 1024), U-XGA (1600, 1200), HD-TV (1920, 1080), and Q-XGA (2048, 1536), as well as (1920, 1035), (720, 480), and (1280, 960). Such values are not limiting.

A driving circuit and the like for driving the display unit may be configured from a variety of circuits. These may be configured using common circuit elements and the like.

The various conditions shown in the present disclosure may be satisfied in a case of being substantially met as well as a case of being strictly met. The presence of different variations resulting from design or manufacturing is acceptable.

First Embodiment

The first embodiment relates to a display apparatus according to the present disclosure.

FIG. 1 is a schematic perspective diagram in which the display apparatus of the first embodiment is virtually separated.

As shown in FIG. 1, the display apparatus 1 is provided with a display unit 10 in which pixels 12 configured from a group of a plurality of types of sub-pixels displaying different primary colors are arranged in a two-dimensional matrix shape in a row direction (X direction in the diagram) and a column direction (Y direction in the diagram); and an optical separation unit 30 separating an image displayed on the display unit 10 into images for a plurality of observation points.

The display apparatus 1 further includes an illumination unit 20 irradiating the display unit 10 from the rear surface, and the optical separation unit 30 is positioned on the front surface of the display unit. The illumination unit 20 may be configured from common members such as a light source, a prism sheet, a diffusion sheet, a light-guiding plate, or the like (these are not shown in the diagram). Diffused light diffused through the diffusion sheet and the like is irradiated toward the rear surface of the display unit 10 from the light emitting surface 21. The optical separation unit 30 separates the image for multiple observation points displayed on the display unit 10 so that it is possible to observe the image for each observation point in each observation region $WA_L$, $WA_C$, and $WA_R$.

The display unit 10 is configured of a front panel of an observation region WA side formed of a transmissive type display panel (specifically, a transmissive type color liquid crystal display panel of an active matrix system), a rear panel of an illumination unit 20 side, a liquid crystal material arranged between the front panel and rear panel, and the like. For convenience of illustration, the display unit 10 is shown as a single panel in FIG. 1.

The display unit 10 displays an image for multiple observation points for observation point $A_1$ through to observation point $A_4$. In the display region 11 of the display unit 10, a total of M×N pixels 12 are arranged with M pixels in the row direction and N pixels in the column direction. Pixels 12 of the $m^{th}$ column (here, m=1, 2 . . . , M), and the $n^{th}$ row (here, n=1, 2 . . . , N) are denoted as the $(m, n)^{th}$ number pixel 12 or as pixel $12_{(m,n)}$. In addition, the $m^{th}$ column pixels (specifically, pixel $12_{(m,1)}$ to pixel $12_{(m,n)}$) may sometimes be denoted as pixels $12_m$. The number of pixels (M, N) of the display unit 10, for example, may be (1024, 768). Pixels 12 are configured by four types of sub-pixels lined up in the column direction. In addition, for convenience of illustration, the sub-pixel display is omitted in FIG. 1. The details of the sub-pixels will be described in detail below referring to FIG. 2 described below.

The optical separation unit 30 is provided with apertures 31 arranged so as to extend in the column direction and line up in the row direction, and a mask unit 32 positioned at a portion other than the apertures 31. The apertures 31 are arranged while lined up in the row direction in plural (P apertures). The $p^{th}$ column (here p=1, 2 . . . , P) of the aperture 31 is denoted as aperture $31_p$.

The optical separation unit 30, for example, is configured by leaving a mask unit 32 on a PET film by a combination of a lithography method and an etching method after forming a light sensitive material layer containing black pigment, and then removing the light sensitive material layer. The portion with the light sensitive material layer removed becomes the aperture 31 and the portion with the light sensitive material layer remaining becomes the mask unit 32. Here, in FIG. 5 described below, the illustration of the PET film which is the base material of the optical separation unit 30 is omitted and the aperture 31 and the mask unit 32 are schematically shown. Further, for clarity, the mask unit 32 is displayed in black.

In each embodiment, the number of observation points of images that are displayed on the display apparatus is described as being the four observation points $A_1$, $A_2$, $A_3$, and $A_4$ respectively in each observation region $WA_L$, $WA_C$, and $WA_R$ shown in FIG. 1. However, this is not limiting. The number of observation regions and the number of observation points may be appropriately set according to the design of the display apparatus.

Above, a summary of the display apparatus 1 has been described. To continue, a summary of the display unit 10 will be described.

FIG. 2 is a schematic plan diagram of a part of the display unit. More specifically, FIG. 2 is a schematic plan diagram of the display unit 10 including the $(m-1)^{th}$ column to the $(m+4)^{th}$ column, and the $n^{th}$ row of pixels 12.

The pixels 12 are configured of the group of four types of subpixels lined up in the column direction, specifically, a group of sub-pixels 12R displaying red (red sub-pixels), sub-pixels 12G displaying green (green sub-pixels), sub-pixels 12B displaying blue (blue sub-pixels), and sub-pixels 12W displaying white (white sub-pixels). In FIG. 2, the reference sign "R" shows a partition of a red sub-pixel 12R, and the reference sign "G" shows a partition of a green sub-pixel 12G. Similarly, the reference sign "B" shows a partition of a blue sub-pixel 12B, and the reference sign "W" shows a partition of a white sub-pixel 12W.

Each sub-pixel 12R, 12G, 12B, and 12W of the periphery is surrounded by a light shielding part 13 formed of wiring such as scanning lines extending in the row direction, and a light shielding part 14 formed of wiring such as signal lines extending in the row direction. The sub-pixels 12R, 12G, 12B, and 12W have a rectangular shape. The reference sign BW shows the width of the light shielding part 14. The width BW is a fixed value in the overall display unit 10.

Description has been given of the columnar arrangement in the row direction of each sub-pixel 12R, 12G, 12B, and 12W configuring the pixel 12. Regarding the uppermost part of the pixel 12 (in FIG. 2, the most +Y direction side), the green sub-pixel 12G and the red sub-pixel 12R are alternately arranged in the row direction. Regarding one stage below the uppermost part (in FIG. 2, the −Y direction side), the blue sub-pixel 12B and the white sub-pixel 12W are alternately arranged in the row direction. Similarly, regarding two stages below the uppermost part, the red sub-pixel 12R and the green sub-pixel 12G are alternately arranged in the row direction. Regarding three stages below the uppermost part (lowest part), the white sub-pixel 12W and the blue sub-pixel 12B are alternately arranged in the row direction. The columnar arrangement of the row direction of each sub-pixel 12R, 12G, 12B, and 12W in regard to the pixels 12 of rows other than the $n^{th}$ row is also the same. Accordingly, in the pixels 12, pixels formed of a group such as [(uppermost part) sub-pixel 12G/sub-pixel 12B/sub-pixel 12R/sub-pixel 12W (lowest part)] and pixels formed of a group such as [(uppermost part) sub-pixel 12R/sub-pixel 12W/sub-pixel 12G/sub-pixel 12B (lowest part)] are alternately lined up in the row direction. In addition, the width TW of the row direction of the sub-pixels 12R, 12G, 12B, and 12W is the same.

The reference signs $LW_R$, $LW_G$, $LW_B$ and $LW_W$ shown in FIG. 2 respectively show the row direction width of the sub-pixels 12R, 12G, 12B, and 12W. In the first embodiment, the widths $LW_R$, $LW_G$, $LW_B$ and $LW_W$ satisfy the conditions shown in formula (1), formula (2), and formula (3) below.

$$LW_R = LW_G \quad (1)$$

$$LW_W > LW_B \quad (2)$$

$$LW_W + LW_B = LW_R + LW_G \quad (3)$$

In the display apparatus 1 shown in FIG. 1, an image signal $VS_R$ for red display, an image signal $VS_G$ for green display, and an image signal $VS_B$ for blue display corresponding to each pixel are input (none of which are shown). Description will be given of the values of the signals driving the sub-pixels 12R, 12G, 12B, and 12W with reference to FIGS. 3A and 3B.

Figure 3B:
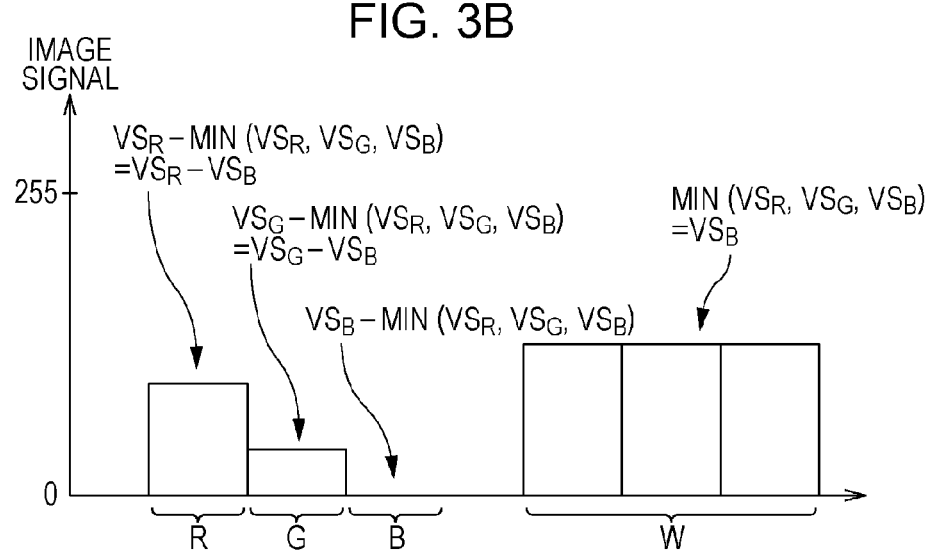

FIGS. 3A and 3B are schematic graphs for describing the signals driving the sub-pixel. In addition, for convenience of description, the image signals $VS_R$, $VS_G$, and $VS_B$ are set to have a gradation of 0 to 255 discretized into 8-bits; however, this is just an example.

As shown in FIG. 3A, the display apparatus 1 calculates the smallest value among the values of the input image signals $VS_R$, $VS_G$, and $VS_B$. The function MIN shown in the diagram ($VS_R$, $VS_G$, $VS_B$) is for providing the smallest value. In the example shown in FIG. 3A, MIN ($VS_R$, $VS_G$, $VS_B$)=$VS_B$.

Thus, as shown in FIG. 3B, the white sub-pixel 12W is driven based on the signal provided by MIN ($VS_R$, $VS_G$, $VS_B$). Meanwhile, the red sub-pixel 12R is driven based on the signal provided by $VS_R$-MIN ($VS_R$, $VS_G$, $VS_B$), the green sub-pixel 12G is driven based on the signal provided by $VS_G$-MIN ($VS_R$, $VS_G$, $VS_B$), and the blue sub-pixel 12B is driven based on the signal provided by $VS_B$-MIN ($VS_R$, $VS_G$, $VS_B$).

Above, a summary of the display unit 10 has been described. Here, description will be given of a case using the display unit of the reference example to facilitate understanding of embodiments of the present disclosure.

Figure 4:
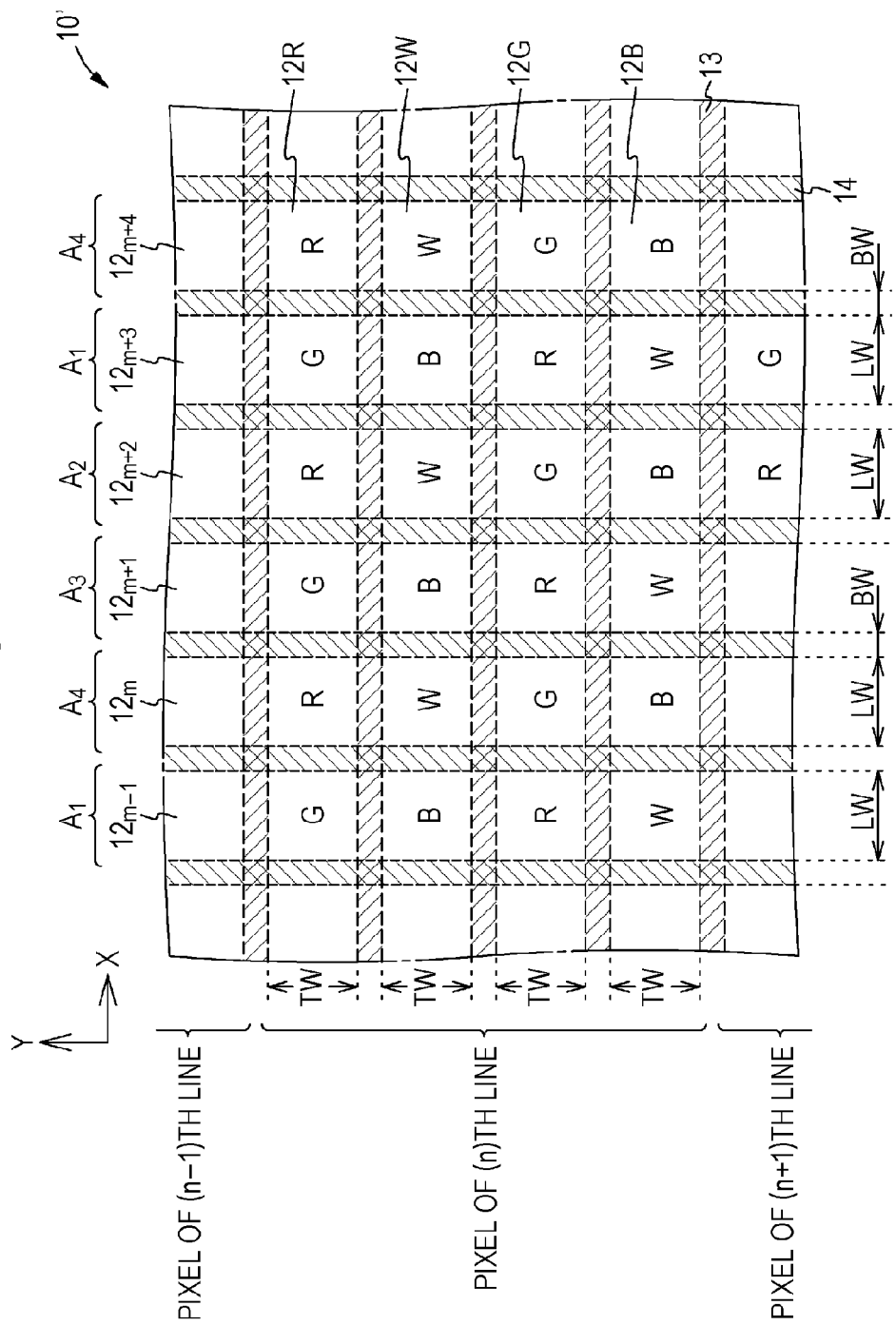
FIG. 4 is a drawing corresponding to FIG. 2 and a schematic plan diagram of a part of a display unit of a reference example in which the widths $LW_R$, $LW_G$, $LW_B$, and $LW_Q$ are all equal.

FIG. 4 is a drawing corresponding to FIG. 2 and a schematic plan diagram of a part of a display unit of a reference example in which the widths $LW_R$, $LW_G$, $LW_B$, and $LW_W$ are all equal. For convenience of description, the reference numbers and the reference signs denoting the constituent elements of the display unit 10' of the reference example are basically the same as the reference numbers and reference signs denoting the constituent elements used in the description of the display unit 10. In addition, since the widths $LW_R$, $LW_G$, $LW_B$, and $LW_W$ are all equal, they are expressed simply as width LW without being distinguished.

First, the positional relationship between the display unit 10' and the optical separation unit 30 will be described when the display unit 10 shown in FIG. 1 is replaced with the display unit 10' of the reference example.

Figure 5:
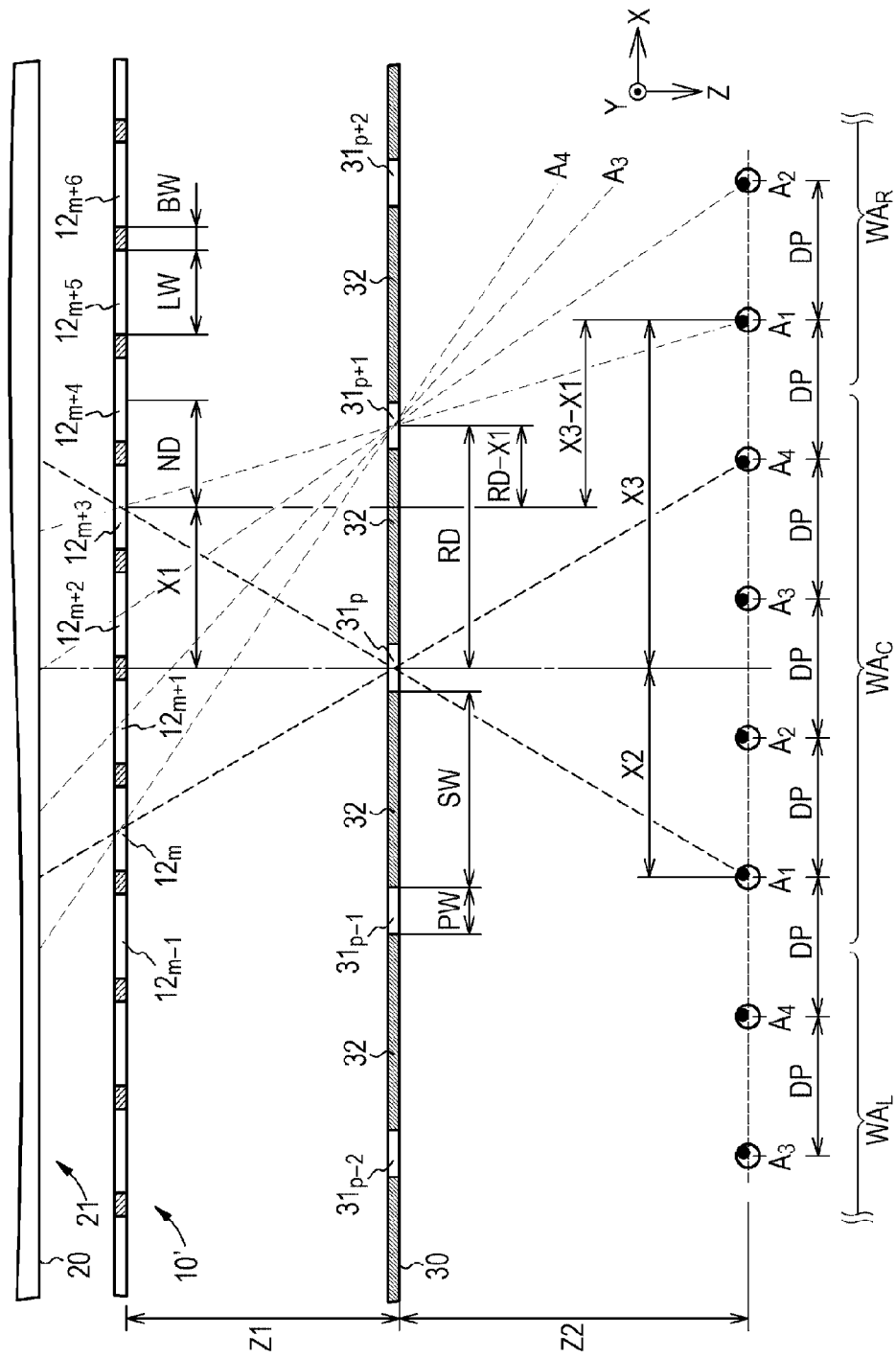
FIG. 5 is a schematic diagram for describing the conditions to be satisfied for the light from the sub-pixels to be directed to observation points $A_1$ to $A_4$ of the center observation region.

FIG. 5 is a schematic diagram for describing the conditions to be satisfied for the light from the sub-pixels to be directed toward observation points $A_1$ to $A_4$ of the center observation region.

For convenience of description, in FIG. 5, aperture $31_p$ of the $p^{th}$ column is positioned at the midpoint between the aperture $31_1$ and the aperture $31_p$. In addition, the midway point between the $(m+1)^{th}$ column pixel $12_{m+1}$ and the $(m+2)^{th}$ column pixel $12_{m+2}$ and the midway point between observation point $A_2$ and observation point $A_3$ in the observation region $WA_C$, are positioned on a virtual straight line extending in the Z direction passing through the midway point of the aperture $31_p$. The pixel pitch is denoted as ND [mm] and the aperture pitch is denoted as RD [mm]. The distance between the optical separation unit 30 and the display unit 10' is denoted as Z1 [mm] and the distance between the optical separation unit 30 and the observation regions $WA_L$, $WA_C$, and $WA_R$ is denoted as Z2 [mm]. Further, the distance between adjacent observation points in the observation regions $WA_L$, $WA_C$, and $WA_R$ is denoted by DP [mm]. The distance between the display unit 10' and the light emitting unit 20 is not particularly limited and is appropriately set to a preferable value according to the specifications of the display apparatus.

If the width of the aperture 31 is denoted by reference sign PW and the width of the mask unit 32 is denoted by reference sign SW, the relationship is aperture pitch RD=SW+PW. Qualitatively, the smaller the value of PW/RD=PW/(SW+PW), the more the orientation of the images for each observation point is improved; however, the brightness of the image to be observed deteriorates. The value of PW/RD may be appropriately set to a preferable value according to the specifications of the display apparatus.

The light from the pixels $12_{m+3}$, $12_{m+2}$, $12_{m+1}$, and $12_m$ passing through the aperture $31_p$ will be respectively examined with regard to the condition of being directed toward the observation points $A_1$, $A_2$, $A_3$, and $A_4$ of the center observation region $WA_C$. For convenience of description, the width PW of aperture 31 is set to be sufficiently small, and description will be given focusing on the light trajectory passing through the midway point of the aperture 31.

With the virtual straight line extending in the Z direction passing through the midway point of the aperture $31_p$ as a reference, the distance to the midway point of the pixel $12_{m+3}$ is denoted by reference sign X1, and the distance to the observation point $A_1$ of the center observation region $WA_C$ is denoted by reference sign X2. When the light from the pixel $12_{m+3}$ passes through the aperture $31_p$ and is directed to the observation point $A_1$ of the observation region $WA_C$, from the similar geometrical relationship, the conditions shown in formula (4) below are satisfied.

$$Z1:X1=Z2:X2 \quad (4)$$

Here, since X1=1.5×ND, and X2=1.5×DP, when these are substituted, formula (4) is expressed like the formula (4') below.

$$Z1:1.5\times ND = Z2:1.5\times DP \quad (4')$$

If the above formula (4') is satisfied, it is geometrically clear that the light from aperture $31_p$ passing through pixels $12_{m+2}$, $12_{m+1}$, and $12_m$ is also directed toward the observation points $A_2$, $A_3$, and $A_4$ of the observation region $WA_C$, respectively.

Next, the light from the pixels $12_{m+3}$, $12_{m+2}$, $12_{m+1}$, and $12_m$ passing through the aperture $31_{p+1}$ will be respectively examined with regard to the condition of being directed toward the observation points $A_1$, $A_2$, $A_3$, and $A_4$ of the right side observation region $WA_R$.

With the virtual straight line extending in the Z direction passing through the midway point of the aperture $31_p$ as a reference, the distance to the observation point $A_1$ of the right side observation region $WA_R$ is denoted by reference sign X3. When the light from the pixel $12_{m+3}$ passes through the aperture $31_{p+1}$ and is directed to the observation point $A_1$ of the observation region $WA_R$, from the similar geometrical relationship, the conditions shown in formula (5) below are satisfied.

$$Z1:RD-X1=(Z1+Z2):(X3-X1) \quad (5)$$

Here, since $X1=1.5\times ND$, and $X3=2.5\times DP$, when these are substituted, formula (5) is expressed like the formula (5') below.

$$Z1:RD-1.5\times ND=(Z1+Z2):(2.5\times DP-1.5\times ND) \quad (5')$$

When the above-mentioned formula (5') is satisfied, it is geometrically clear that the light from aperture $31_{p+1}$ passing through pixels $12_{m+2}$, $12_{m+1}$, and $12_m$ is also directed toward the observation points $A_2$, $A_3$, and $A_4$ of the observation region $WA_C$, respectively.

The values of the distance Z2 and the distance DP are set to a predetermined value based on the specifications of the display apparatus. Further, the value of the pixel pitch ND is determined according to the structure of the display unit 10'. From formulae (4') and (5'), with regard to the distance Z1 and the aperture pitch RD, the formulae (6) and (7) below are obtained.

$$Z1=Z2\times ND/DP \quad (6)$$

$$RD=4\times DP\times ND/(DP+ND) \quad (7)$$

For example, when the pixel pitch ND of the display unit 10' is 0.300 [mm], the distance Z2 is 300 [mm], and the distance DP is 65.0 [mm], the distance Z1 is approximately 1.39 [mm] and the aperture pitch RD is approximately 1.19 [mm].

In the above example, the value of the aperture pitch RD is approximately four times the value of the pixel pitch ND. Therefore, the aforementioned "M" and "P" are in a relationship of $M \approx P\times 4$.

The distance Z1 and the aperture pitch RD are set so as to satisfy the above-described conditions, and it is possible to observe an image for predetermined observation points in each of the observation points $A_1$, $A_2$, $A_3$, and $A_4$ in the observation regions $WA_L$, $WA_C$, and $WA_R$.

Next, with reference to FIGS. 6 to 8, a description will be given of visibility deterioration due to observation point movement.

Figure 6:
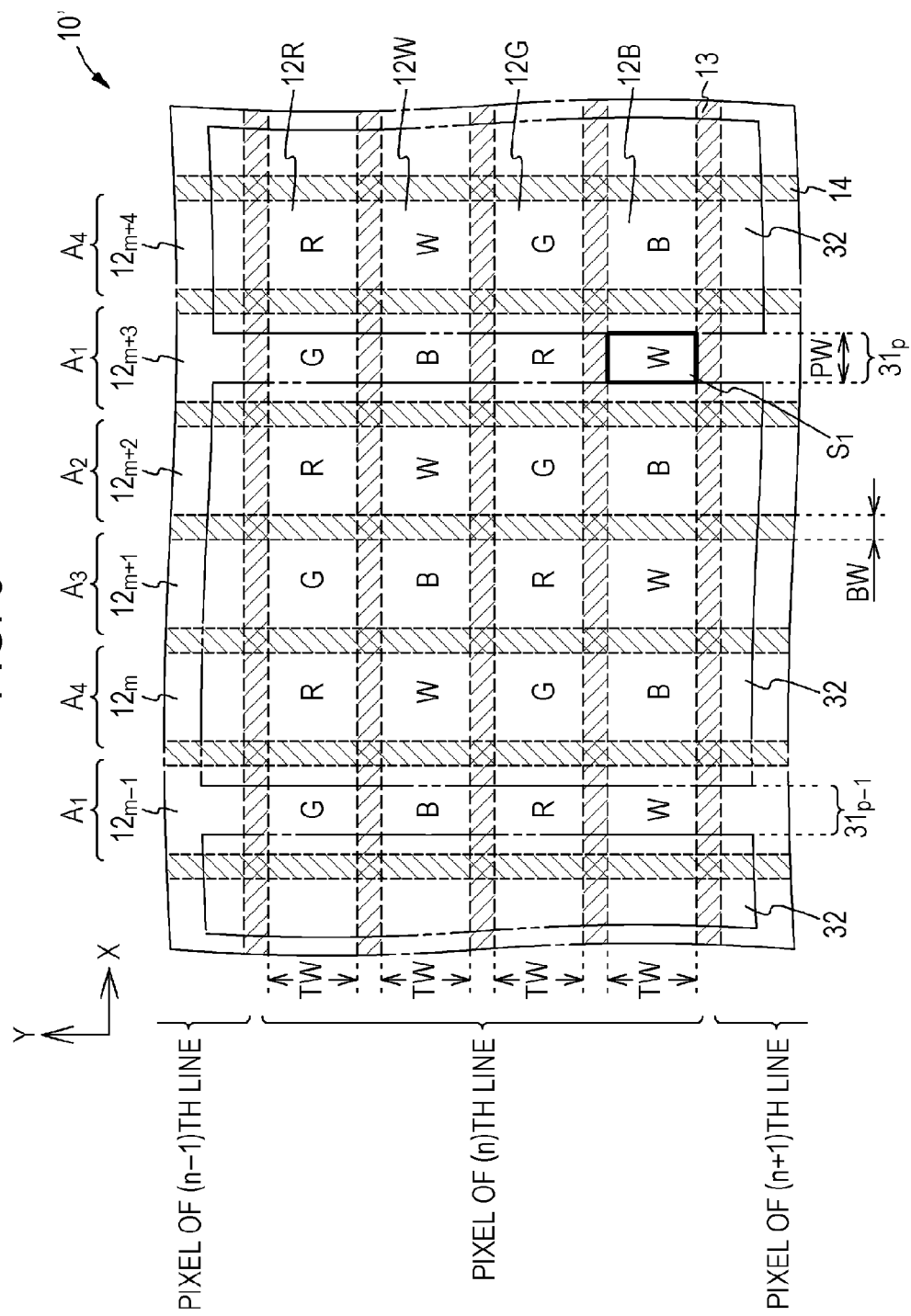
FIG. 6 is a schematic plan diagram for describing the area of the white sub-pixels observed through the aperture $31_p$ when the observation point of the image observer is at observation point $A_1$ in a case of using the display unit of the reference example.

FIG. 6 is a schematic plan diagram for describing the area of the sub-pixels observed through the aperture $31_p$ when the observation point of the image observer is at observation point $A_1$ in a case of using the display unit of the reference example.

For example, focusing on the area of the white sub-pixel 12W, in this case, the white sub-pixel 12W of the $12_{m+3}^{th}$ column is observed through the aperture $31_p$. The value of area $S_1$ in which white is displayed is provided by the formula $S_1=TW\times PW$.

Figure 7:
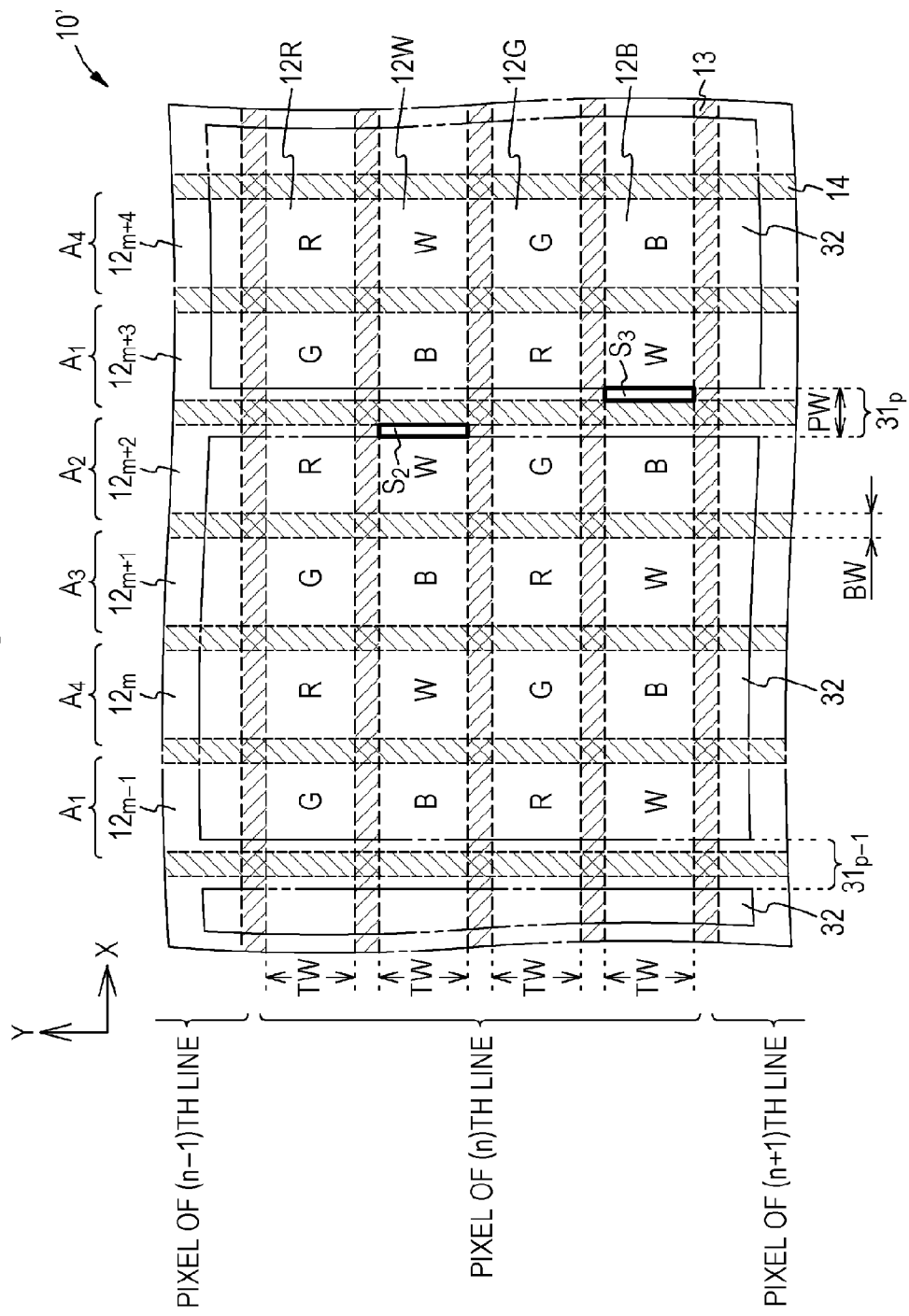
FIG. 7 is a schematic plan diagram for describing the area of the sub-pixels observed through the aperture $31_p$ when the observation point of the image observer is between observation point $A_1$ and observation point $A_2$ in a case of using the display unit of the reference example.

FIG. 7 is a schematic plan diagram for describing the area of the sub-pixels observed through the aperture $31_p$ when the observation point of the image observer is between observation point $A_1$ and observation point $A_2$ in a case of using the display unit of the reference example.

In this case, the white sub-pixel 12W of the $12_{m+3}^{th}$ column and the white sub-pixel 12W of the $12_{m+2}^{th}$ column are observed through the aperture $31_p$. The value of the area in which white is displayed is provided by the sum of the values of area $S_2$ and area $S_3$. Here, $S_2+S_3=TW\times (PW-BW)$.

Thus, in FIG. 7 corresponding to FIG. 6, the area of the white sub-pixel 12W observed through the aperture $31_p$ is made smaller and the light amount is reduced. The same applies to the other sub-pixels 12R, 12G, and 12B. Variation in the area due to movement of the observation point changes according to the positional relationship of the aperture $31_p$ and the light shielding part 14.

Figure 8:
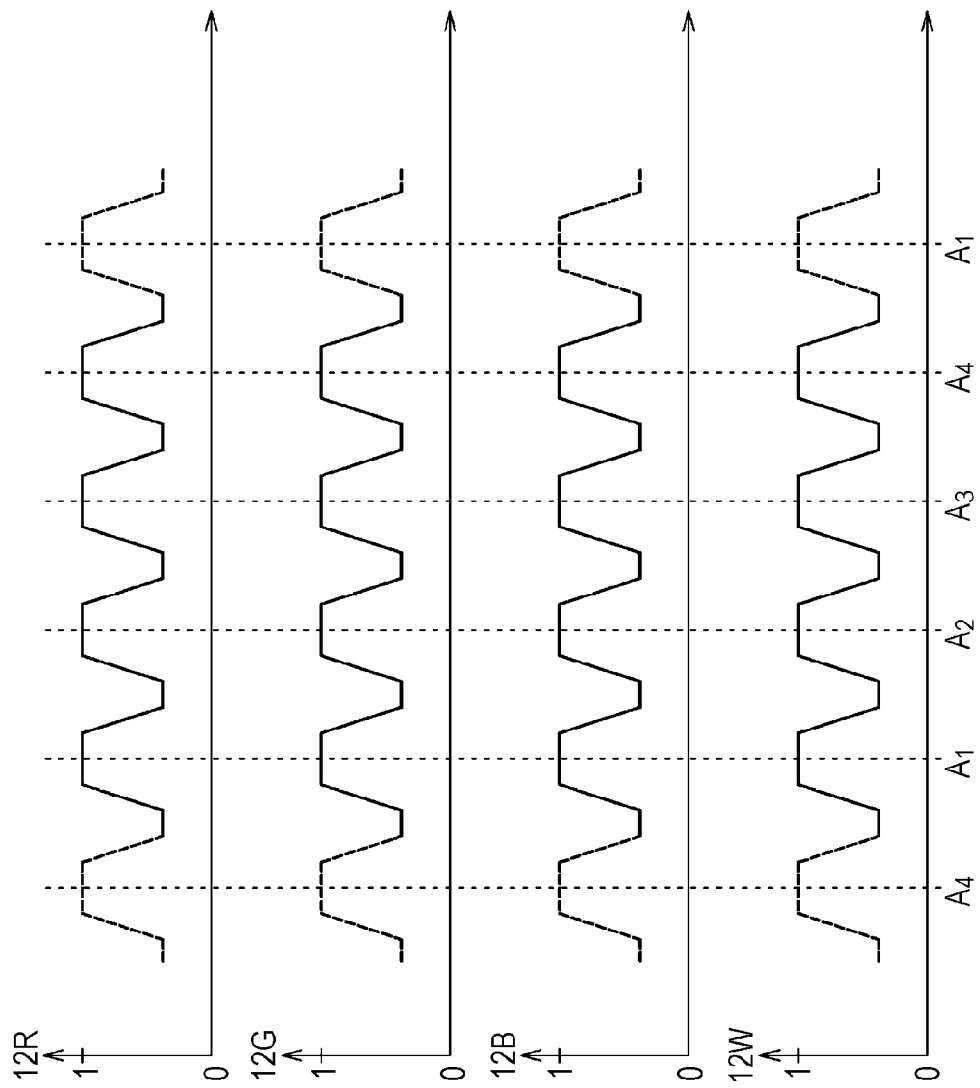
FIG. 8 is a schematic graph for describing the relationship of the movement of the observation point of the image observer and the change of the area of the sub-pixels observed through the aperture $31_p$ in a case of using the display unit of the reference example.

FIG. 8 is a schematic graph for describing the relationship of the movement of the observation point of the image observer and the change of the area of the sub-pixels 12R, 12G, 12B, and 12W of the $n^{th}$ row observed through the aperture $31_p$ in a case of using the display unit of the reference example.

In FIG. 8, the horizontal axis of the graph represents the position of the observation point. The vertical axis of the graph shows the area of each sub-pixel observed through the aperture $31_p$. The value of the vertical axis is normalized with the area $S_1$ described above as a reference.

When the observation point of the image observer is moved, the area of the pixel observed through the aperture 31 is changed as shown in FIG. 8 throughout the whole of the display unit. Therefore, when the observation point of the image observer is moved, brightness variation and moiré occur in the displayed image and visibility is deteriorated.

Above, issues in a case of using the display unit of the reference example have been described. Next, description will be given of a case of using the display unit 10 shown in FIG. 2.

Description will be given of the relationship between the distance between the boundaries of respectively adjacent sub-pixel columns formed of sub-pixels displaying the first primary color and the distance between the boundaries of respectively adjacent sub-pixel columns formed of the same type of sub-pixels displaying a different primary color to the first primary color when one of the primary colors displayed by the sub-pixels 12R, 12G, 12B and 12W is expressed as a first primary color.

Among red, green, blue and white, white is the primary color with the highest luminosity. Here, among the primary colors displayed by the sub-pixels, white is represented as the first primary color.

Below, as will be described with reference to FIG. 9 to FIG. 11, the distance between the boundaries of respectively adjacent sub-pixel columns formed of sub-pixels 12W displaying the first primary color (white) is shorter than the distance between the boundaries of respectively adjacent sub-pixel columns formed of the same type of sub-pixels displaying different primary colors to the first primary color (that is, red, green and blue).

Figure 9:
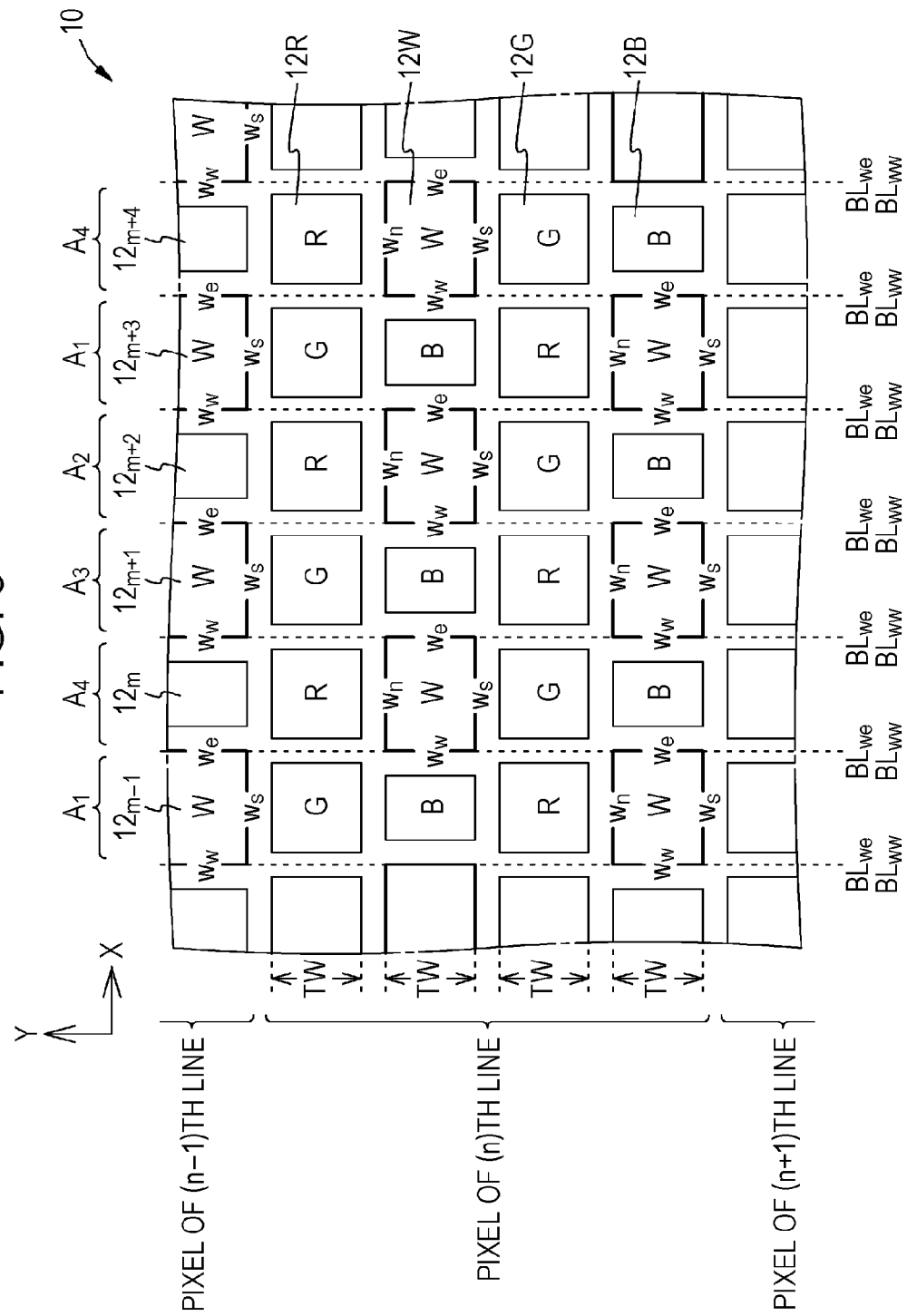
FIG. 9 is a schematic plan diagram of a part of a display unit and is for describing the boundaries of sub-pixel columns formed of sub-pixels displaying white.

FIG. 9 is a schematic plan diagram of a part of a display unit and is for describing the boundaries of sub-pixel columns formed of sub-pixels displaying white.

The part of the +Y direction side in the sub-pixel 12W (top) is represented by the reference sign $w_n$ and the part of the −Y direction side (bottom) is represented by the reference sign $w_s$. Similarly, the part of the +X direction side (right side) is represented by the reference sign $w_e$ and the part of the −X direction side (left side) is represented by the reference sign $w_w$.

For example, focusing on the sub-pixel column formed of the sub-pixels 12W belonging to the pixel $12_{m-1}$ of the $(m-1)^{th}$ column and the sub-pixel column formed of the sub-pixels 12W belonging to the pixel $12_m$ of the $m^{th}$ column, these two sub-pixel columns are configured by respectively adjacent sub-pixel columns. Focusing on the boundary of these two adjacent sub-pixel columns, the boundary of the $(m-1)^{th}$ sub-pixel column becomes a boundary $BL_{we}$ having a straight line shape including the part $w_e$. In addition, the boundary of the $m^{th}$ sub-pixel column becomes a boundary $BL_{ww}$ having a straight line shape including the part $w_w$. The distance between the boundary $BL_{we}$ and the boundary $BL_{ww}$ is zero. In other words, the boundary $BL_w$, and the boundary $BL_{ww}$ overlap. The same applies to the other white sub-pixel columns.

Figure 10:
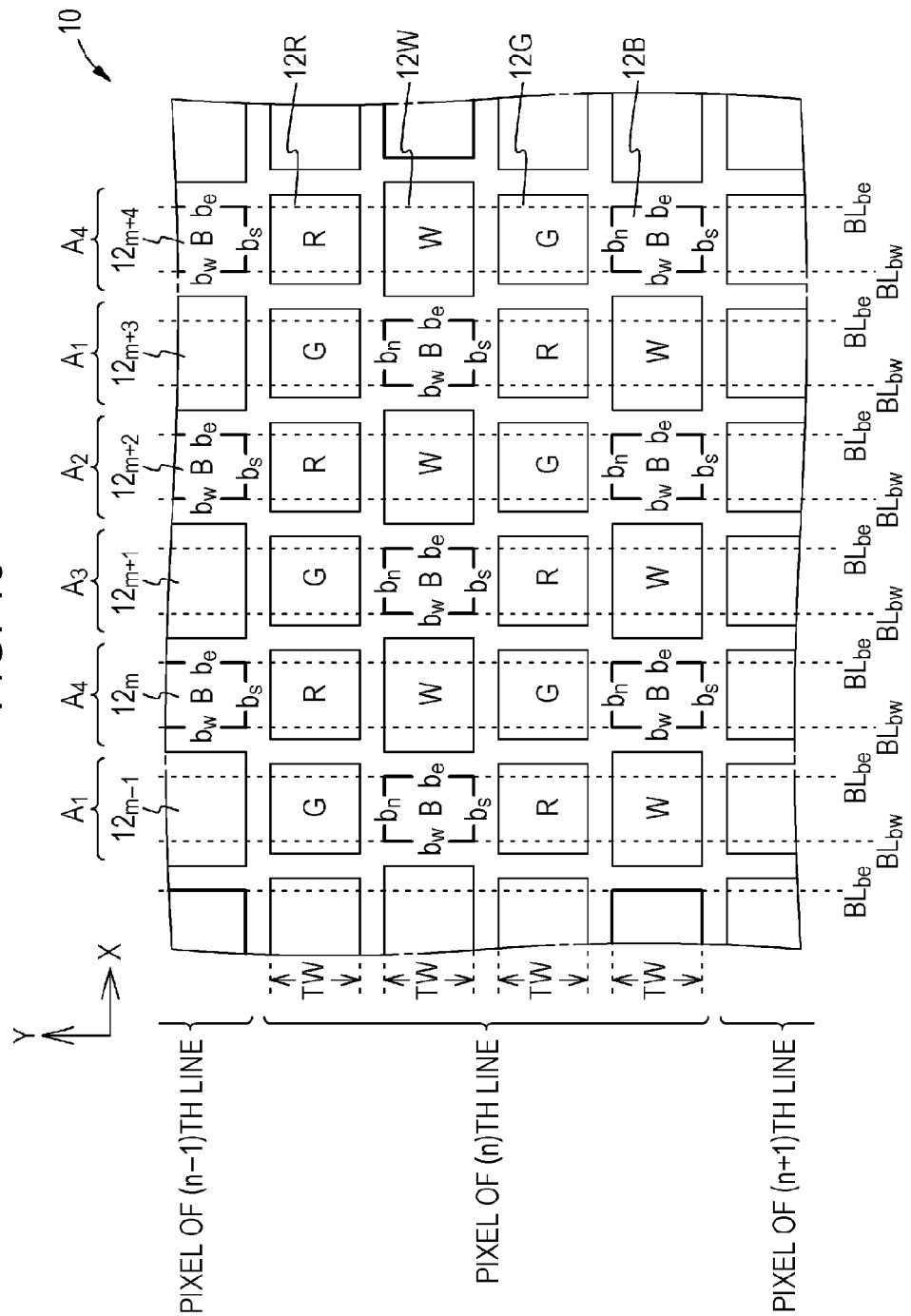
FIG. 10 is a schematic plan diagram of a part of a display unit and is for describing the boundaries of sub-pixel columns formed of sub-pixels displaying blue.

FIG. 10 is a schematic plan diagram of a part of a display unit and is for describing the boundaries of sub-pixel columns formed of sub-pixels displaying blue.

The part of the +Y direction side in the sub-pixel 12B (top) is represented by the reference sign $b_n$ and the part of the −Y direction side (bottom) is represented by the reference sign $b_s$. Similarly, the part of the +X direction side (right side) is represented by the reference sign $b_e$ and the part of the −X direction side (left side) is represented by the reference sign $b_w$.

Similar to that described for the sub-pixel 12W boundaries described above, focusing on the sub-pixel column formed of the sub-pixels 12B belonging to the pixel $12_{m-1}$ of the $(m-1)^{th}$ column and the sub-pixel column formed of the sub-pixels 12B belonging to the pixel $12_m$ of the $(m)^{th}$ column, these two sub-pixel columns are configured by respectively adjacent sub-pixel columns. Focusing on the boundary of these two adjacent sub-pixel columns, the boundary of the $(m-1)^{th}$ sub-pixel column becomes a boundary $BL_{be}$ having a straight line shape including the part $b_e$. In addition, the boundary of the $m^{th}$ sub-pixel column becomes a boundary $BL_{bw}$ having a straight line shape including the part $b_w$. The distance between the boundary $BL_{be}$ and the boundary $BL_{bw}$ is greater than the width BW of the light shielding part 14 shown in FIG. 2.

Figure 11:
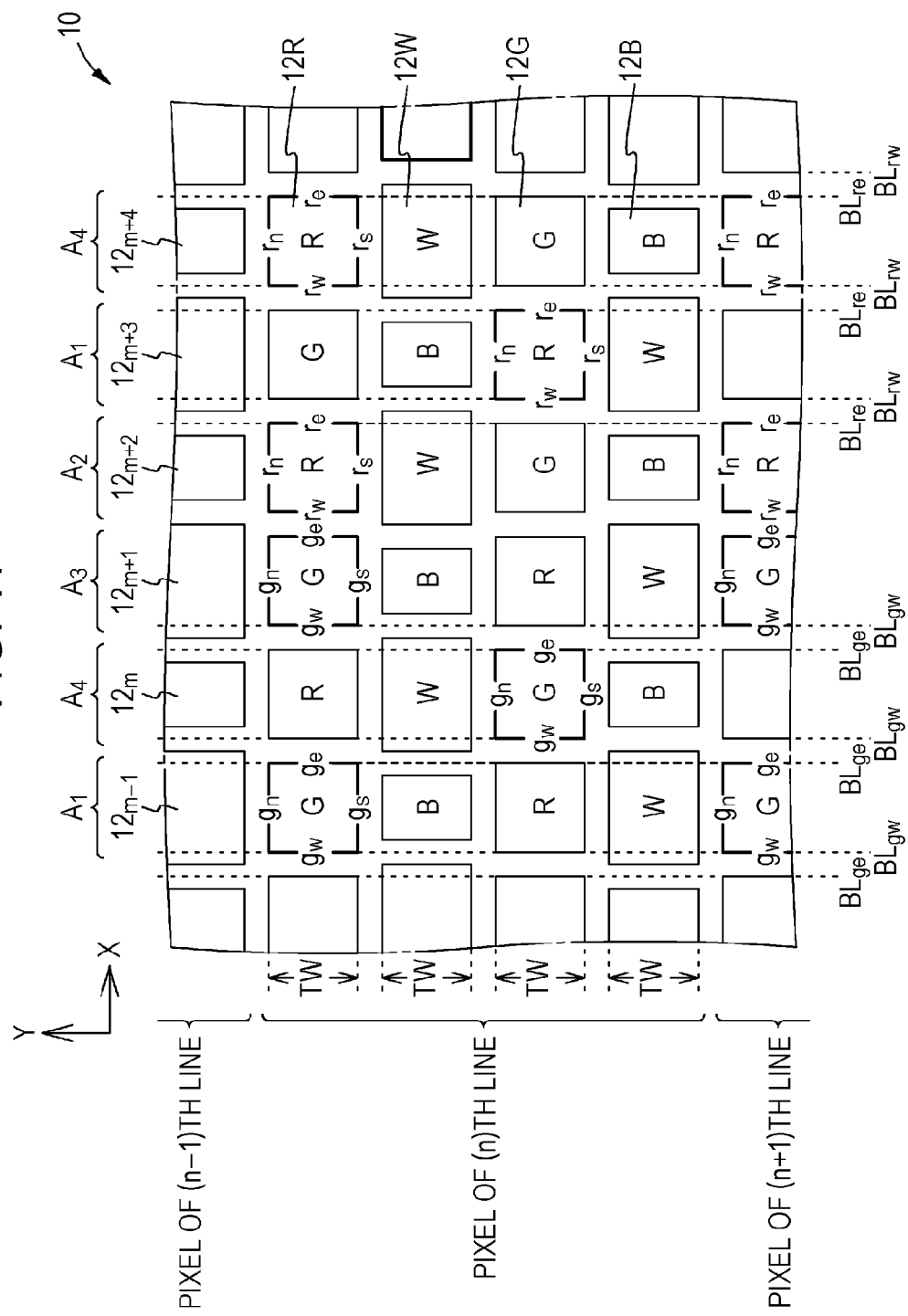
FIG. 11 is a schematic plan diagram of a part of a display unit and is for describing the boundaries of sub-pixel columns formed of sub-pixels displaying red and the boundaries of sub-pixel columns formed of sub-pixels displaying green.

FIG. 11 is a schematic plan diagram of a part of a display unit and is for describing the boundaries of sub-pixel columns formed of sub-pixels displaying red and the boundaries of sub-pixel columns formed of sub-pixels displaying green.

The part of the +Y direction side in the sub-pixel 12R (top) is represented by the reference sign $r_n$ and the part of the −Y direction side (bottom) is represented by the reference sign $r_s$. Similarly, the part of the +X direction side (right side) is represented by the reference sign $r_e$ and the part of the −X direction side (left side) is represented by the reference sign $r_w$. Further, the part of the +Y direction side in the sub-pixel 12G (top) is represented by the reference sign $g_n$ and the part of the −Y direction side (right) is represented by the reference sign $g_s$. Similarly, the part of the +X direction side (top side) is represented by the reference sign $g_e$ and the part of the −X direction side (right side) is represented by the reference sign $g_w$.

Similar to that described for the sub-pixel 12W boundaries described above, focusing on the sub-pixel column formed of the sub-pixel 12R belonging to the pixel $12_{m+2}$ of the $(m+2)^{th}$ column and the sub-pixel column formed of the sub-pixel 12R belonging to the pixel $12_{m+3}$ of the $(m+3)^{th}$ column, these two sub-pixel columns are configured by respectively adjacent sub-pixel columns. Focusing on the boundary of these two adjacent sub-pixel columns, the boundary of the $(m+2)^{th}$ sub-pixel column becomes a boundary $BL_{re}$ having a straight line shape including the part $r_e$. In addition, the boundary of the $(m+3)^{th}$ sub-pixel column becomes a boundary $BL_{rw}$ having a straight line shape including the part $r_w$. Here, the distance between the boundary $BL_{re}$ and the boundary $BL_{rw}$ is the same as the width BW of the light shielding part 14 shown in FIG. 2. The reference signs in the description of the sub-pixel 12R may be appropriately applied mutatis mutandis to the relationship of the boundaries of the sub-pixels formed of the sub-pixels 12G. The distance between boundary $BL_{ge}$ and boundary $BL_{gw}$ is also the same as the width BW of the light shielding part 14 shown in FIG. 2.

As described above, the distance between the boundaries of respectively adjacent sub-pixel columns formed of sub-pixels 12W displaying the first primary color (white) is shorter than the distance between the boundaries of respectively adjacent sub-pixel columns formed of the same type of sub-pixels displaying different primary colors to the first primary color.

Among red, green, blue and white, blue is the primary color with the lowest luminosity. If blue among the primary colors displayed by the sub-pixels is expressed as the second primary color, the distance between the boundaries of respectively adjacent sub-pixel columns formed of sub-pixels 12B displaying the second primary color is longer than the distance between the boundaries of respectively adjacent sub-pixel columns formed of the same type of sub-pixels displaying different primary colors to the second primary color. The sub-pixels displaying the first primary color and the sub-pixels displaying the second primary color are alternately lined up in the row direction and arranged.

By the configuration described above, as shown later in FIG. 14, visibility deterioration due to observation point movement is reduced with regard to the pixels displaying the first primary color. In this manner, it is possible to reduce visibility deterioration due to observation point movement.

Figure 12:
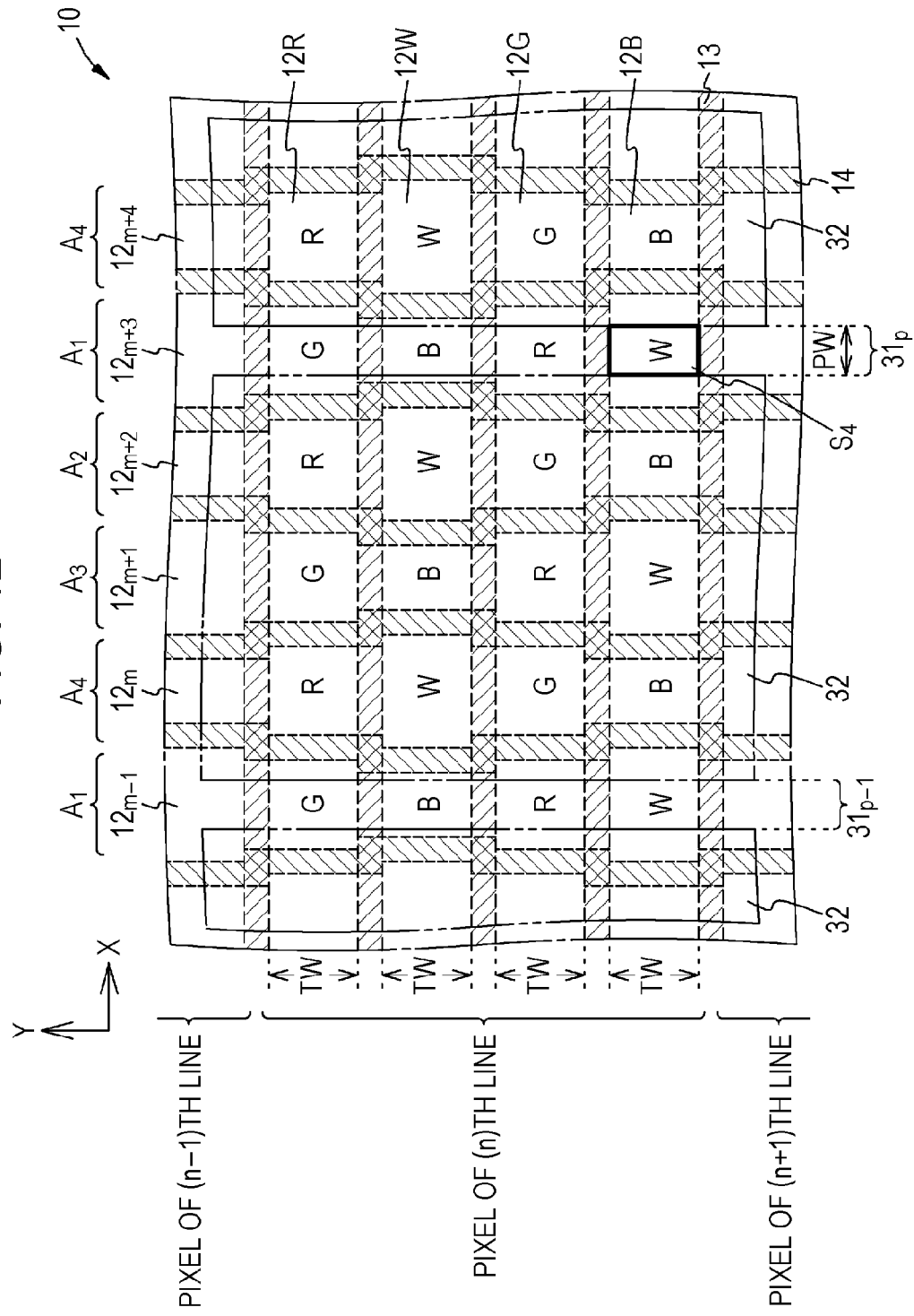
FIG. 12 is a schematic plan diagram for describing the area of the white sub-pixels observed through the aperture $31_p$ when the observation point of the image observer is at observation point $A_1$ in the display apparatus of the first embodiment.

FIG. 12 is a schematic plan diagram for describing the area of the white sub-pixels observed through the aperture $31_p$ when the observation point of the image observer is at observation point $A_1$ in the display apparatus of the first embodiment.

Focusing on the area of the white sub-pixel 12W, the white sub-pixel 12W of the $12_{m+3}^{th}$ column is observed through the aperture $31_p$. The value of area $S_4$ displaying white is provided by the formula $S_4 = TW \times PW$.

Figure 13:
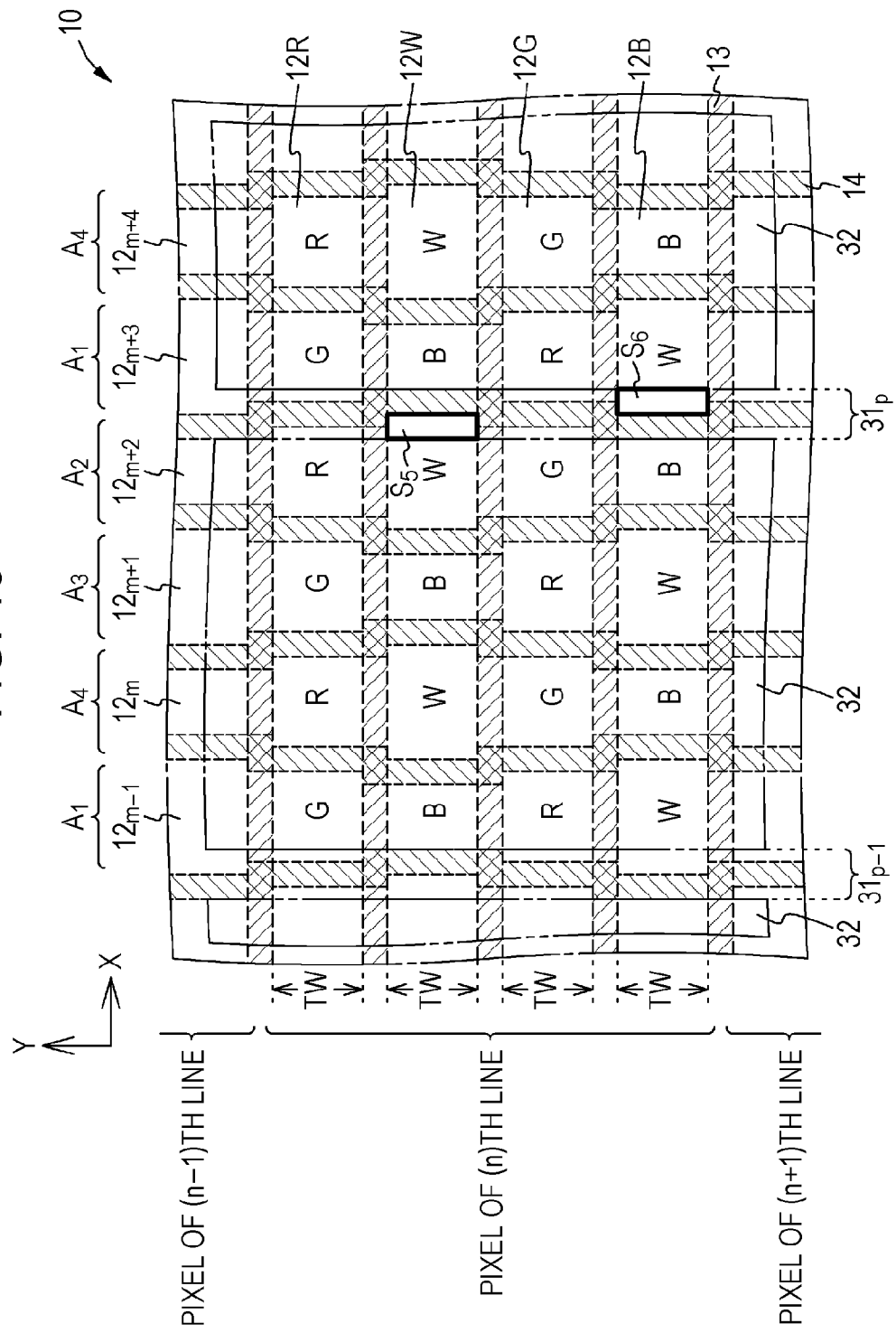
FIG. 13 is a schematic plan diagram for describing the area of the white sub-pixels observed through the aperture $31_p$ when the observation point of the image observer is between observation point $A_1$ and observation point $A_2$ in the display apparatus of the first embodiment.

FIG. 13 is a schematic plan diagram for describing the area of the white sub-pixels observed through the aperture $31_p$ when the observation point of the image observer is between observation point $A_1$ and observation point $A_2$ in the display apparatus of the first embodiment.

In this case, the white sub-pixels 12W of the $12_{m+3}^{th}$ column and the white sub-pixels 12W of the $12_{m+2}^{th}$ column are observed through the aperture $31_p$. The value of the area displaying white is provided by the sum of the values of the area $S_5$ and the area $S_6$. As described above, since the boundary $BL_{we}$ and the boundary $BL_{ww}$ overlap, $S_5 + S_6 = TW \times PW$.

Thus, in FIG. 12 and FIG. 13, the area of the white sub-pixels 12W observed through the aperture $31_p$ is fixed. For example, when adjacent sub-pixels 12W have the same brightness, the light amount is fixed. Thus, even if the positional relationship between the aperture $31_p$ and the light shielding part 14 changes, the area of the white sub-pixels 12W observed through the aperture $31_p$ is fixed.

Figure 14:
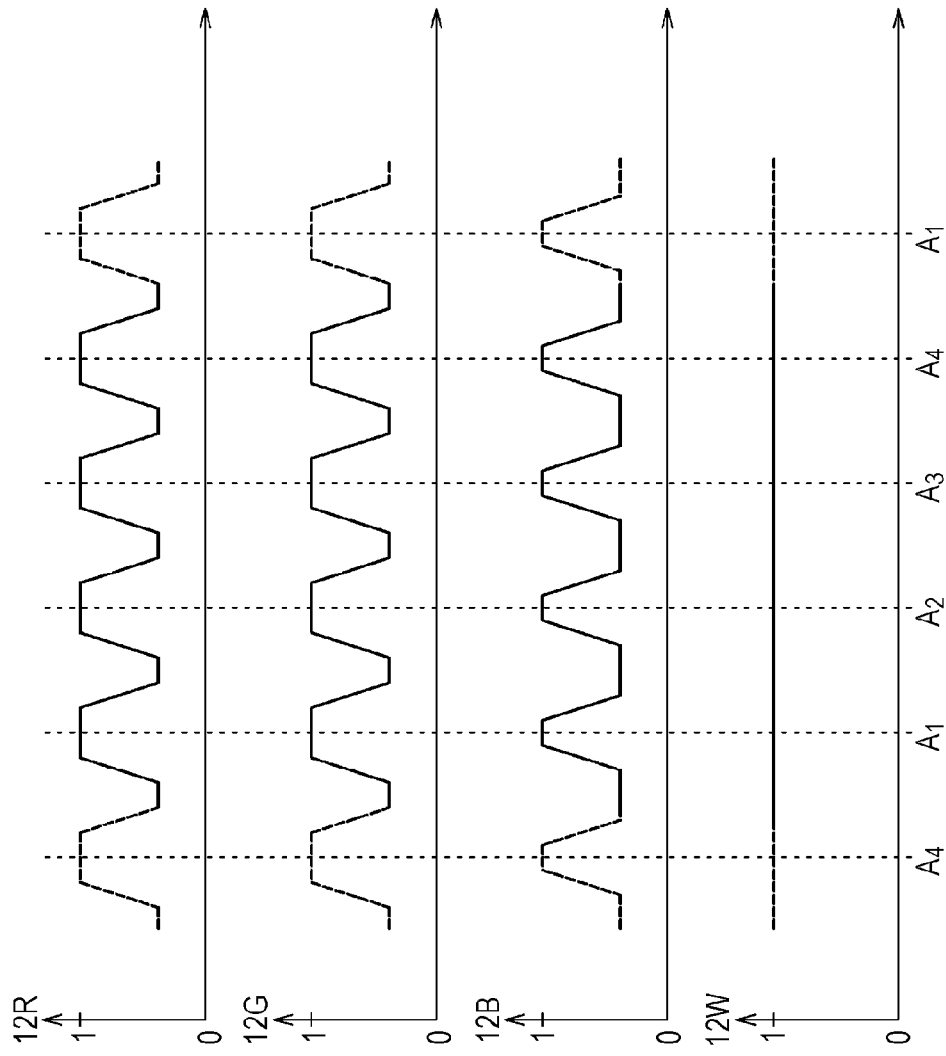
FIG. 14 is a schematic graph for describing the relationship of the movement of the observation point of the image observer and the change of the area of the sub-pixels observed through the aperture $31_p$ in the display apparatus of the first embodiment.

FIG. 14 is a schematic graph for describing the relationship of the movement of the observation point of the image observer and the change of the area of the sub-pixels 12R, 12G, 12B, and 12W observed through the aperture $31_p$ in the display apparatus of the first embodiment. Since the horizontal axis and vertical axis are the same as described in FIG. 8, description thereof will be omitted.

If the width $LW_R$ and the width $LW_G$ shown in FIG. 2 are the same as the width LW shown in FIG. 4, the graph of the red sub-pixel 12R and the green sub-pixel 12G shown in FIG. 14 is the same as the graph shown in FIG. 8. On the other hand, as is clear from comparing FIGS. 8 and 14, the area of the white sub-pixels 12W observed through the aperture 31 is fixed even if the observation point is moved. Among red, green, blue and white, since white is the primary color with the highest luminosity, changes in the brightness of the image and moiré due to movement of the observation point are reduced.

In addition, in the display apparatus of the first embodiment, the movement of the observation point of the image observer and the change in the area of the blue sub-pixels 12B observed through the aperture 31 are somewhat more noticeable than in a case of using the display unit 10' of the reference example. However, since the contribution to the brightness channel from the S-cones of the retina in human vision is extremely small, there is little effect on changes in brightness and moiré and it does not lead to any problems.

Above, specific description was given of the embodiments of the present disclosure; however, the present disclosure is not limited to the above embodiments and various modifications based on the technical concept of the embodiments of the present disclosure are possible.

For example, it is possible to make various changes to the columnar arrangement of the sub-pixels of the display unit.

Figure 15:
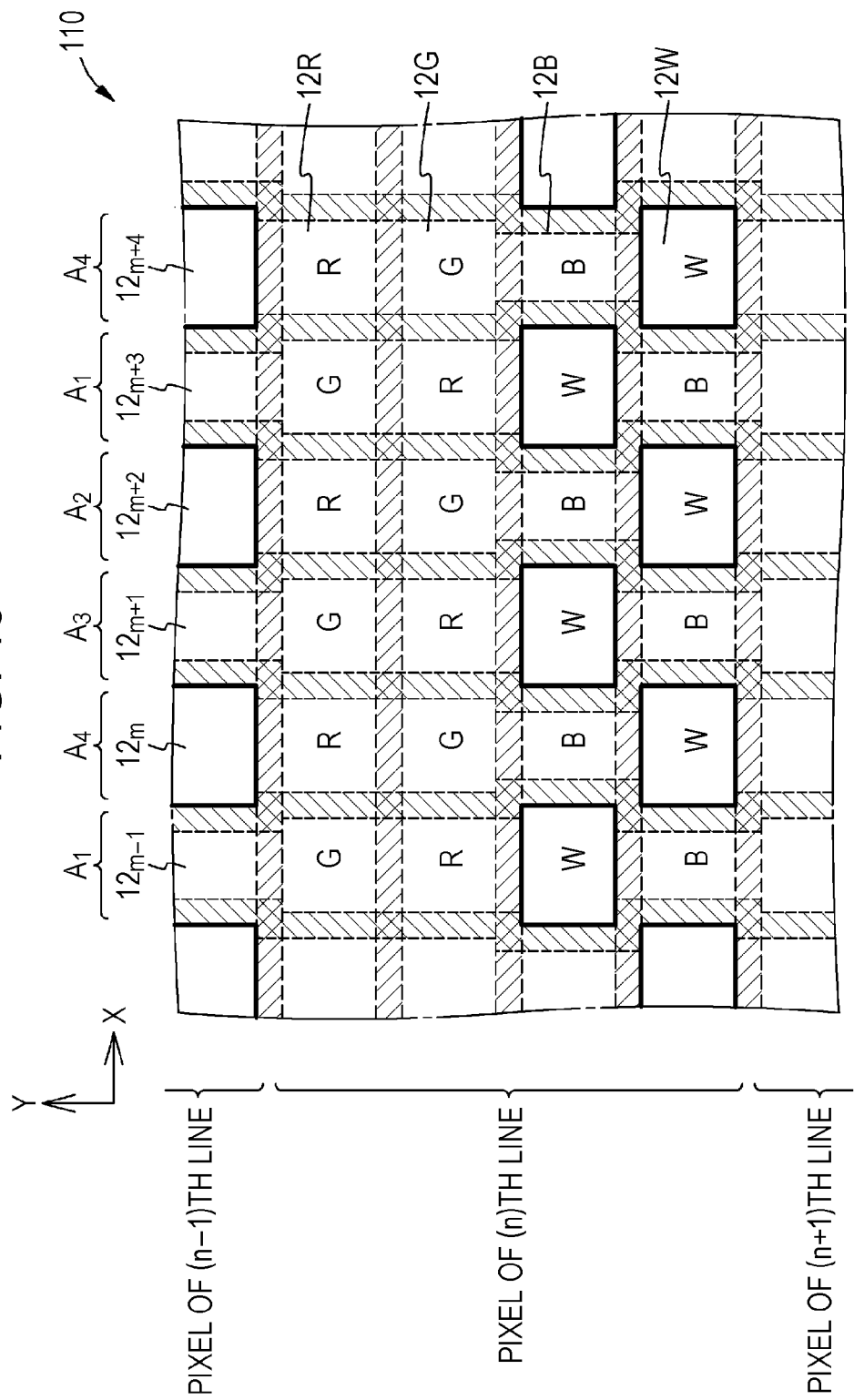
FIG. 15 is a schematic plan diagram of a part of the display unit of a modification.

FIG. 15 is a schematic plan diagram of a part of the display unit of a modification.

In the display unit 110 shown in FIG. 15, in the pixels 12, pixels formed of a group such as [(uppermost part) sub-pixel 12G/sub-pixel 12R/sub-pixel 12W/sub-pixel 12B (lowest part)] and pixels formed of a group such as [(uppermost part) sub-pixel 12R/sub-pixel 12G/sub-pixel 12B/sub-pixel 12W (lowest part)] are alternately lined up in the row direction.

Figure 16:
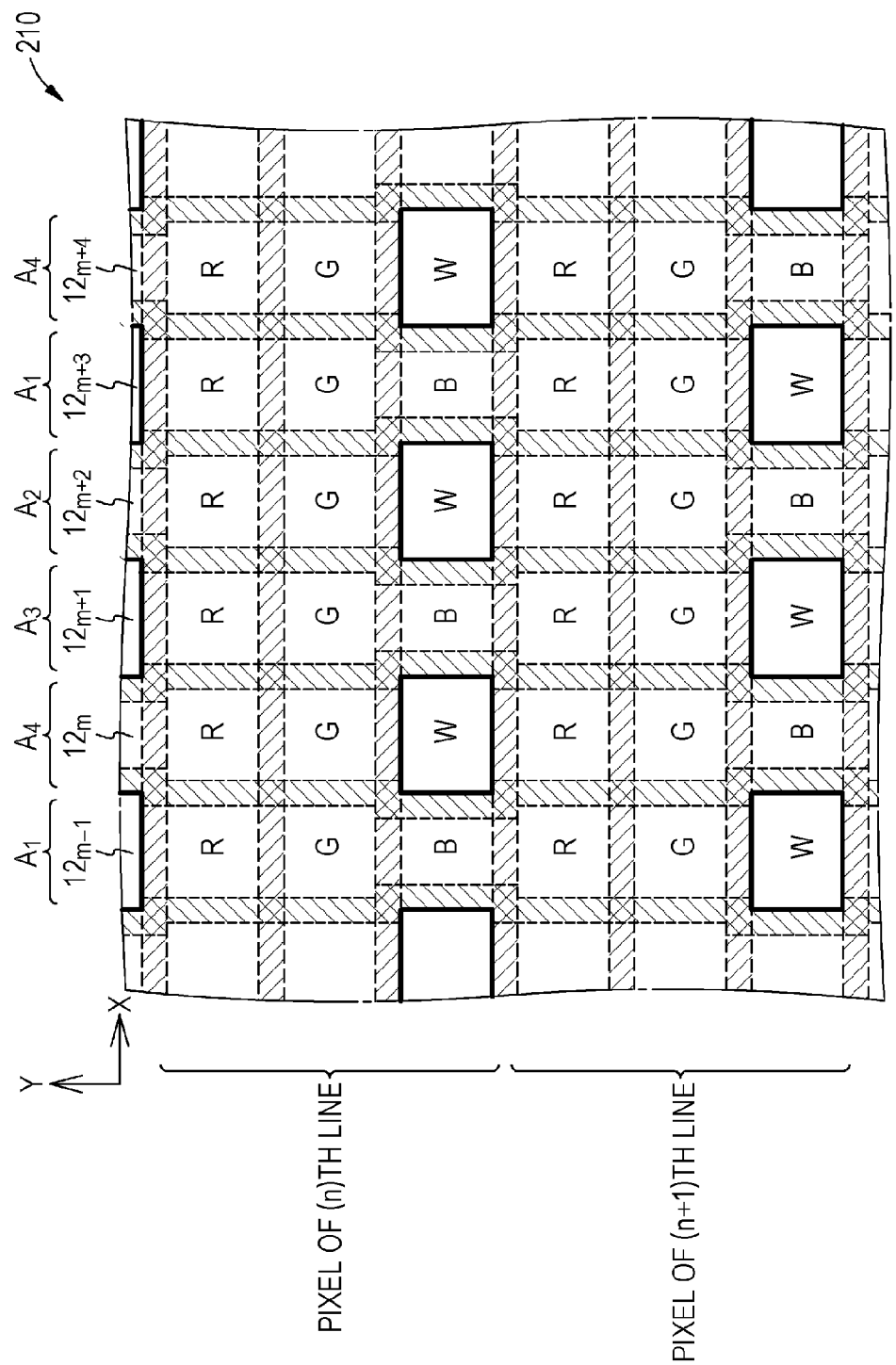
FIG. 16 is a schematic plan diagram of a part of the display unit of the modification.

FIG. 16 is also a schematic plan diagram of a part of the display unit of the modification.

In the display unit 210 shown in FIG. 16, the pixels 12 are configured of a group formed of the sub-pixels 12R, 12G, and 12B and a group formed of the sub-pixels 12R, 12G, and 12W. Here, in the pixels 12, pixels formed of a group such as [(uppermost part) sub-pixel 12R/sub-pixel 12G/sub-pixel 12B (lowest part)] and pixels formed of a group such as [(uppermost part) sub-pixel 12R/sub-pixel 12G/sub-pixel 12W (lowest part)] are alternately lined up in the row direction.

Figure 17:
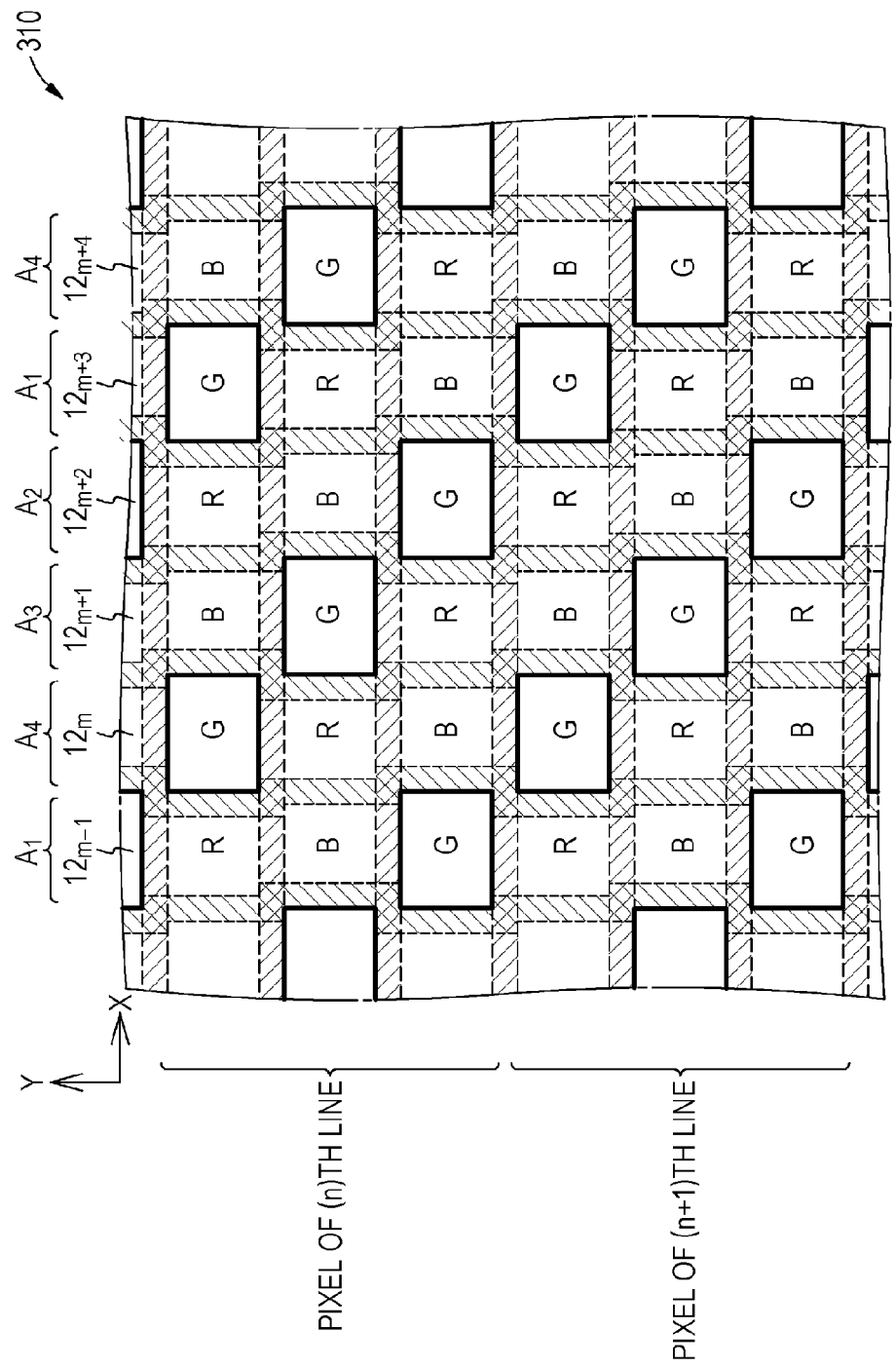
FIG. 17 is a schematic plan diagram of a part of the display unit of the modification.
Figure 18:
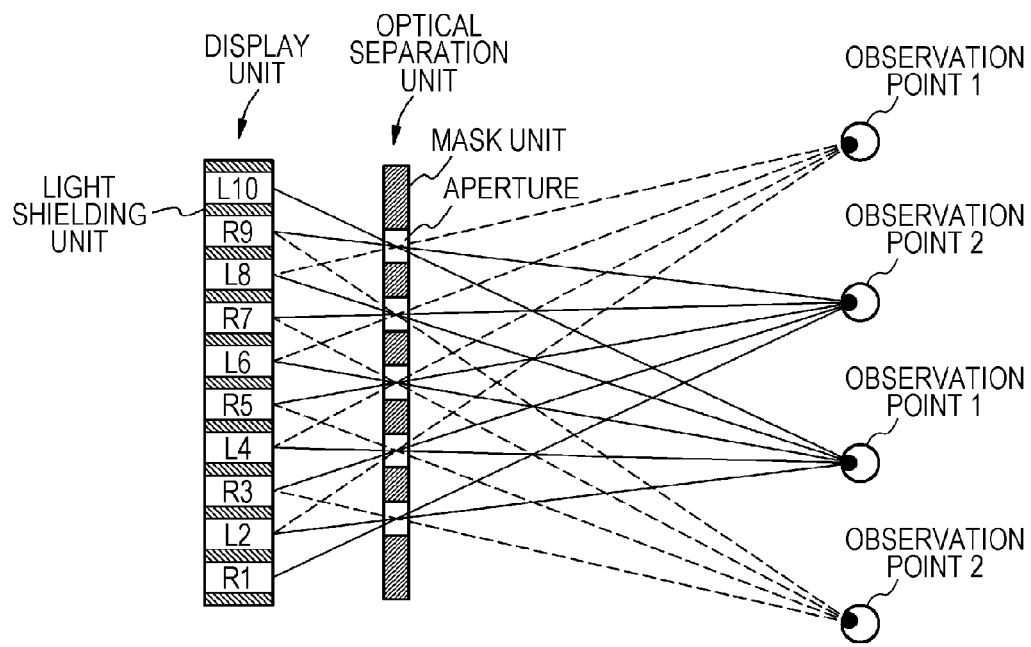
FIG. 18 is a conceptual diagram of a display apparatus in which an optical separation unit is arranged on the front surface of a display unit.
Figure 19:
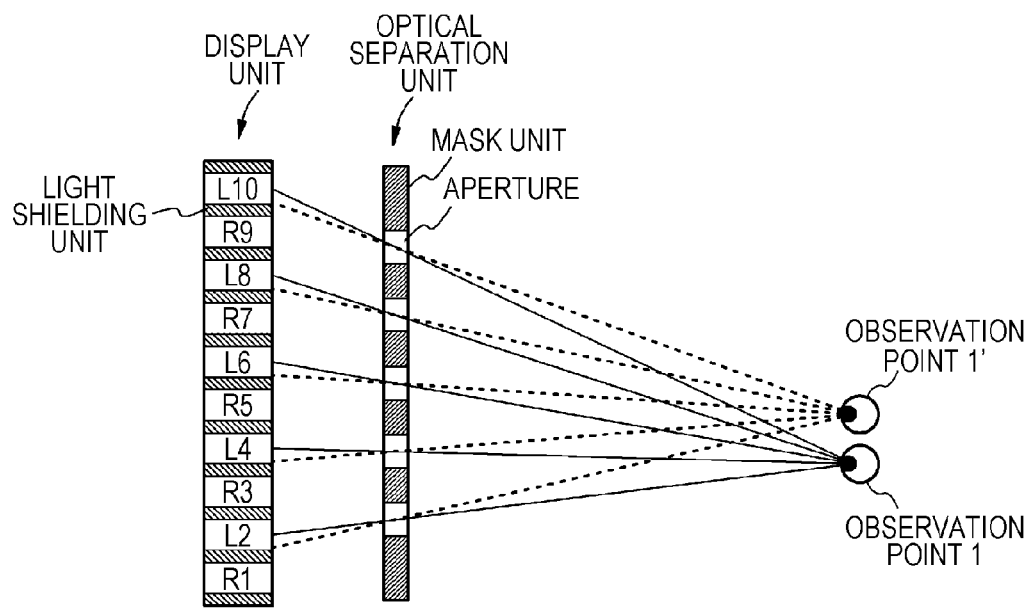
FIG. 19 is a schematic conceptual diagram for describing a situation when an image is observed at an observation point 1' separated from an ideal observation point 1.

FIG. 17 is a schematic plan diagram of a part of the display unit of the modification.

In the display unit 310 shown in FIG. 17, the pixels 12 are configured of a group formed of the sub-pixels 12R, 12G, and 12B. In this case, green, which has the highest luminosity, may be set as the first primary color.

Here, the technology of the embodiments of the present disclosure may adopt the following configurations.
(1) A display apparatus including: a display unit in which pixels configured from a group of a plurality of types of sub-pixels displaying different primary colors are arranged in a two-dimensional matrix shape in a row direction and a column direction; and an optical separation unit separating an image displayed on the display unit into images for a plurality of observation points, in which, when one of the primary colors displayed by the sub-pixels is expressed as a first primary color, the distance between the boundaries of the respectively adjacent sub-pixel columns formed of the sub-pixels displaying the first primary color is shorter than the distance between the boundaries of respectively adjacent sub-pixel columns formed of the same type of sub-pixels displaying different primary colors to the first primary color.
(2) The display apparatus according to (1) in which the first primary color is the primary color with the highest luminosity in the primary colors displayed by the sub-pixels.
(3) The display apparatus according to (1) or (2) in which, when the primary color having the lowest luminosity in the primary colors displayed by the sub-pixels is expressed as a second primary color, the distance between boundaries of respectively adjacent sub-pixel columns formed of sub-pixels displaying the second primary color is longer than the distance between boundaries of respectively adjacent sub-pixel columns formed of the same type of sub-pixels displaying different primary colors to the second primary color.
(4) The display apparatus according to (3) in which the sub-pixels displaying the first primary color and the sub-pixels displaying the second primary color are alternately lined up in the row direction and arranged.
(5) The display apparatus according to any one of (1) to (4) in which the boundaries of the respectively adjacent sub-pixel columns formed of sub-pixels displaying the first primary color overlap.

The present disclosure contains subject matter related to that disclosed in Japanese Priority Patent Application JP 2011-067214 filed in the Japan Patent Office on Mar. 25, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A display apparatus comprising:
a display unit including a plurality of pixels, the pixels including first pixels and second pixels that are alternately arranged in a row direction, each of the pixels being comprised of four sub-pixels that display different colors and are arranged in a column direction, the sub-pixels including (a) a first sub-pixel displaying a first color that is different from the primary colors of red, blue, and green, (b) a second sub-pixel displaying a second color, (c) a third sub-pixel displaying a third color, and (d) a fourth sub-pixel displaying a fourth color, the second color, the third color, and the fourth color being primary colors and different from each other; and
an optical separation unit having apertures, and separating an image displayed on the display unit into images for a plurality of observation points,
wherein,
the first sub-pixels have higher luminosity per a given area than any of the second sub-pixels, the third sub-pixels, or the fourth sub-pixels,
the second sub-pixels have lower luminosity per the given area than any of the first sub-pixels, the third sub-pixels, or the fourth sub-pixels,
a width of the first sub-pixels in the row direction is larger than a width of any of the second sub-pixel, a width of the third sub-pixel, or a width of the fourth sub-pixel in the row direction,
the width of the second sub-pixels in the row direction is smaller than the width of the first sub-pixel, the width of the third sub-pixel, or the width of the fourth sub-pixel in the row direction,
the first sub-pixel in each of the first pixels is arranged adjacent in the row direction to the second sub-pixel in one or more of the second pixels, the second sub-pixel having a smaller width than any of the width of the first sub-pixel in the same second pixel, the width of the third sub-pixel in the same second pixel, and the width of the fourth sub-pixel in the same second pixel,
the third sub-pixel of each of the first pixels is arranged adjacent in the row direction to the fourth sub-pixel of one or more of the second pixels, a total width of the first sub-pixel and the second sub-pixel is substantially equal to a total width of the third sub-pixel and the fourth sub-pixel, and luminosity per the given area of the first sub-pixels observed through one of the apertures is substantially constant even if one of the observation points is moved.

2. The display apparatus according to claim 1, wherein, proceeding in a same row direction:

in each column of the first pixels, the first sub-pixels are aligned in the column direction having a first side of the first sub-pixels aligned with a first boundary line A and a second side of the first sub-pixels aligned with a first boundary line B, in each column of the second pixels, the first sub-pixels are aligned in the column direction having a first side of the first sub-pixels aligned with a second boundary line A and a second side of the first sub-pixels aligned with a second boundary line B, and the second boundary line A is coincident with the first boundary line B when the first pixels and the second pixels are adjacent in the row direction.

3. The display apparatus according to claim 1, wherein: the first color is white, and the second color is blue.

4. The display apparatus according to claim 1, wherein, proceeding in a same row direction:

in each column of the first pixels, the first sub-pixels are aligned in the column direction having a first side of the first sub-pixels aligned with a first boundary line A and a second side of the first sub-pixels aligned with a first boundary line B, in each column of the second pixels, the first sub-pixels are aligned in the column direction having a first side of the first sub-pixels aligned with a second boundary line A and a second side of the first sub-pixels aligned with a second boundary line B, and a first boundary width is a width between the first boundary line B and the second boundary line A that is adjacent to the first boundary line B;

in each column of the first pixels, the second sub-pixels are aligned in the column direction having a first side of the second sub-pixels aligned with a first boundary line C and second side of the second sub-pixels aligned with a first boundary line D, in each column of the second pixels, the second sub-pixels are aligned in the column direction having a first side of the second sub-pixels aligned with a second boundary line C and a second side of the second sub-pixels aligned with a second boundary line D, and a second boundary width is a width between the first boundary line D and the second boundary line C that is adjacent to first boundary line D; and the first boundary width is smaller than the second boundary width.

5. The display apparatus according to claim 4, wherein, proceeding in the same row direction:

in each column of the first pixels, the third sub-pixels are aligned in the column direction having a first side of the third sub-pixels aligned with a first boundary line E and a second side of the third sub-pixels aligned with a first boundary line F, in each column of the second pixels, the third sub-pixels are aligned in the column direction having a first side of the third sub-pixels aligned with a second boundary line E and a second side of the third sub-pixels aligned with a second boundary line F, a third boundary width is a width between the second boundary line E and the first boundary line F that is adjacent to the first boundary line F;

in each column of the first pixels, the fourth sub-pixels are aligned in the column direction having a first side of the fourth sub-pixels aligned with a first boundary line G and a second side of the fourth sub-pixels aligned with a first boundary line H, in each column of the second pixels, the fourth sub-pixels are aligned in the column direction having a first side of the fourth sub-pixels aligned with a second boundary line G and a second side of the fourth sub-pixels aligned with a second boundary line H, and a fourth boundary width is a width between the first boundary line H and the second boundary line G that is adjacent to the first boundary line G; and the first boundary width is smaller than the second boundary width, the third boundary width, and the fourth boundary width.

6. The display apparatus according to claim 1, further comprising:

a first light shielding portion between the second sub-pixel of the first pixel and the first sub-pixel of the second pixel; and a second light shielding portion between the first sub-pixel of the first pixel and the second sub-pixel of the second pixel, wherein, a side, which is closer to the first sub-pixel, of the first light shielding portion is in alignment with a side, which is closer to the first sub-pixel, of the second shielding portion.

* * * * *